US009327900B2

(12) United States Patent
Cafaro et al.

(10) Patent No.: US 9,327,900 B2
(45) Date of Patent: May 3, 2016

(54) METHOD AND APPARATUS FOR CARTRIDGE-BASED CARBONATION OF BEVERAGES

(71) Applicant: Keurig Green Mountain, Inc., Waterbury, VT (US)

(72) Inventors: Enrico Raffaele Cafaro, Beverly, MA (US); Ralph K. Maider, Jr., Milton, MA (US); Michael Sack, North Reading, MA (US); Steven Raphaelson, Watertown, MA (US); J. Corey Michal, Beverly, MA (US); Kevin Sweeney, Malden, MA (US); Brian B. Johnson, Newfields, NH (US); James Passemato, Arlington, MA (US); Peter Rae Peterson, Williston, VT (US); Richard M. Estabrook, South Burlington, VT (US); Thomas Fedorka, Billerica, MA (US); Scott Grubb, Cambridge (GB); Wai Ting Chan, Cambridge (GB); Christopher Covey, Cambridge (GB); Gary Stacey, Cambridge (GB); Raymond Carroll, Marlton, NJ (US)

(73) Assignee: Keurig Green Mountain, Inc., Waterbury, VT (US)

(*) Notice: Subject to any disclaimer, the term of this patent is extended or adjusted under 35 U.S.C. 154(b) by 0 days.

(21) Appl. No.: 14/641,483

(22) Filed: Mar. 9, 2015

(65) Prior Publication Data

US 2016/0068334 A1    Mar. 10, 2016

Related U.S. Application Data

(60) Provisional application No. 62/048,095, filed on Sep. 9, 2014.

(51) Int. Cl.
*B65D 77/08*    (2006.01)
*A23L 2/54*    (2006.01)

(Continued)

(52) U.S. Cl.
CPC .............. *B65D 85/8043* (2013.01); *A23L 2/54* (2013.01); *A23L 2/56* (2013.01); *B65D 77/08* (2013.01); *A23V 2002/00* (2013.01)

(58) Field of Classification Search
CPC ...... B65D 85/8043; B65D 77/08; A23L 2/54; A23L 2/56; A23V 2002/00
USPC .................. 426/77, 78, 79, 80, 81, 82, 83, 84
See application file for complete search history.

(56) References Cited

U.S. PATENT DOCUMENTS

| 716,474 A | 12/1902 | Price |
| 1,945,489 A | 1/1934 | Manley |

(Continued)

FOREIGN PATENT DOCUMENTS

| DE | 102007001609 A1 | 7/2008 |
| GB | 1051012 | 12/1966 |

(Continued)

OTHER PUBLICATIONS

Annex dated May 11, 2011, International Application No. PCT/US2011/023157.

(Continued)

*Primary Examiner* — Erik Kashnikow
*Assistant Examiner* — Ericson M Lachica
(74) *Attorney, Agent, or Firm* — Wolf, Greenfield & Sacks, P.C.

(57) ABSTRACT

Systems, methods and cartridges for carbonating or otherwise dissolving gas in a precursor liquid, such as water, to form a beverage are disclosed. A gas source, which is used to generate gas that is dissolved into the precursor liquid, and/or a beverage medium, such as a powdered drink mix or liquid syrup, may be provided in a cartridge. The use of one or more cartridges for the gas source and/or beverage medium may make for an easy to use and mess-free system for making sparkling beverages, e.g., in the consumer's home.

29 Claims, 27 Drawing Sheets

(51) Int. Cl.
   *A23L 2/56* (2006.01)
   *B65D 85/804* (2006.01)

(56) References Cited

U.S. PATENT DOCUMENTS

| | | |
|---|---|---|
| 2,072,350 A | 3/1937 | Welker |
| 2,201,430 A | 5/1940 | Deibel |
| 2,219,032 A | 10/1940 | Kantor |
| 3,628,444 A | 12/1971 | Mazza |
| 3,851,797 A | 12/1974 | Jacobs |
| 3,888,998 A | 6/1975 | Sampson et al. |
| 3,930,053 A | 12/1975 | Japikse et al. |
| 4,007,134 A | 2/1977 | Liepa et al. |
| 4,011,733 A | 3/1977 | Kuckens et al. |
| 4,025,655 A | 5/1977 | Whyte et al. |
| 4,040,342 A | 8/1977 | Austin et al. |
| 4,110,255 A | 8/1978 | Liepa et al. |
| 4,186,215 A | 1/1980 | Buchel |
| 4,214,011 A | 7/1980 | Strube |
| 4,316,409 A | 2/1982 | Adams et al. |
| 4,458,584 A | 7/1984 | Annese et al. |
| 4,475,448 A | 10/1984 | Shoaf et al. |
| 4,493,441 A | 1/1985 | Sedam et al. |
| 4,636,337 A | 1/1987 | Gupta et al. |
| 4,804,112 A | 2/1989 | Jeans |
| 4,839,107 A | 6/1989 | Rudick et al. |
| 4,927,567 A | 5/1990 | Rudick |
| 5,021,219 A | 6/1991 | Rudick et al. |
| 5,073,312 A | 12/1991 | Burrows |
| 5,102,627 A | 4/1992 | Plester |
| 5,115,956 A | 5/1992 | Kirschner et al. |
| 5,160,461 A | 11/1992 | Burrows |
| 5,182,084 A | 1/1993 | Plester |
| 5,192,513 A | 3/1993 | Stumphauzer et al. |
| 5,312,017 A | 5/1994 | Schroeder et al. |
| 5,350,587 A | 9/1994 | Plester |
| 5,510,060 A | 4/1996 | Knoll |
| 5,553,749 A | 9/1996 | Oyler et al. |
| 5,565,149 A | 10/1996 | Page et al. |
| 5,611,937 A | 3/1997 | Jarocki |
| 5,992,685 A | 11/1999 | Credle, Jr. |
| 6,138,995 A | 10/2000 | Page |
| 6,182,949 B1 | 2/2001 | Mobbs |
| 6,253,960 B1 | 7/2001 | Bilskie et al. |
| 6,324,850 B1 | 12/2001 | Davis |
| 6,712,342 B2 | 3/2004 | Bosko |
| 7,094,434 B2 | 8/2006 | Gaonkar et al. |
| 7,114,707 B2 | 10/2006 | Rona et al. |
| 7,267,247 B1 | 9/2007 | Crunkleton, III et al. |
| 7,288,276 B2 | 10/2007 | Rona et al. |
| 7,407,154 B2 | 8/2008 | Sakakibara et al. |
| 2003/0188540 A1 | 10/2003 | Van Winkle |
| 2004/0134932 A1 | 7/2004 | Lobdell |
| 2005/0029287 A1 | 2/2005 | Mobbs |
| 2006/0000851 A1 | 1/2006 | Girard et al. |
| 2008/0148948 A1 | 6/2008 | Evers et al. |
| 2008/0187638 A1* | 8/2008 | Hansen .................. 426/433 |
| 2009/0282987 A1 | 11/2009 | Macmahon et al. |
| 2009/0311384 A1 | 12/2009 | Macmahon et al. |
| 2010/0133708 A1 | 6/2010 | Fischer |
| 2010/0139496 A1 | 6/2010 | Santoiemmo |
| 2010/0203198 A1* | 8/2010 | Yoakim et al. ............ 426/80 |
| 2010/0251901 A1 | 10/2010 | Santoiemmo |
| 2011/0020508 A1 | 1/2011 | Santoiemmo |
| 2011/0226343 A1 | 9/2011 | Novak et al. |
| 2013/0129870 A1* | 5/2013 | Novak et al. ............ 426/115 |
| 2014/0023754 A1* | 1/2014 | Abegglen et al. ............ 426/112 |

FOREIGN PATENT DOCUMENTS

| | | |
|---|---|---|
| GB | 1143742 | 2/1969 |
| GB | 2038953 A | 7/1980 |
| GB | 2076628 | 12/1981 |
| GB | 2234187 | 1/1991 |
| JP | 53-091181 | 8/1978 |
| JP | 2003231592 | 8/2003 |
| WO | WO 2008/115047 A1 | 9/2008 |
| WO | WO 2008/124851 A1 | 10/2008 |
| WO | 2010/128028 A1 | 11/2010 |

OTHER PUBLICATIONS

Invitation to Pay Additional Fees from the International Searching Authority for International Application No. PCT/US2012/049356, Mailed Nov. 27, 2012.

Invitation to Pay Additional Fees dated Dec. 23, 2015 for International patent application No. PCT/US2015/048854 (7 pages).

\* cited by examiner

METHOD AND APPARATUS FOR CARTRIDGE-BASED CARBONATION OF BEVERAGES

CROSS-REFERENCE TO RELATED APPLICATIONS

This application claims the benefit of U.S. Provisional application No. 62/048,095, filed Sep. 9, 2014.

BACKGROUND

The inventions described herein relate to dissolving gas in liquids, e.g., carbonation, for use in preparing a beverage. Systems for carbonating liquids and/or mixing liquids with a beverage medium to form a beverage are described in a wide variety of publications, including U.S. Pat. Nos. 4,025,655, 4,040,342; 4,636,337; 6,712,342 and 5,182,084; and PCT Publication WO 2008/124851.

SUMMARY OF INVENTION

Aspects of the invention relate to carbonating or otherwise dissolving a gas in a precursor liquid, such as water, to form a beverage. In some embodiments, a carbon dioxide or other gas source can be provided in a cartridge which is used to generate carbon dioxide or other gas that is dissolved into the precursor liquid. A beverage medium, such as a powdered drink mix or liquid syrup, may be provided in the same cartridge as the gas source and mixed with the precursor liquid (either before or after carbonation) to form a beverage. The use of one or more cartridges for the gas source and/or beverage medium may make for an easy to use and mess-free system for making carbonated or other sparkling beverages, e.g., in the consumer's home. A beverage medium included in a cartridge may include any suitable beverage making materials (beverage medium), such as concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutriceuticals, etc.), powdered or liquid milk or other creamers, sweeteners, thickeners, and so on. (As used herein, "mixing" of a liquid with a beverage medium includes a variety of mechanisms, such as the dissolving of substances in the beverage medium in the liquid, the extraction of substances from the beverage medium, and/or the liquid otherwise receiving some material from the beverage medium or otherwise combining with the beverage medium.) (The term "carbonation" or "carbonated" is used herein to generically refer to beverages that have a dissolved gas, and thus refers to a sparkling beverage whether the dissolved gas is carbon dioxide, nitrogen, oxygen, air or other gas. Thus, aspects of the invention are not limited to forming beverages that have a dissolved carbon dioxide content, but rather may include any dissolved gas.)

In one aspect of the invention, a beverage cartridge includes a top surface, a bottom surface, a lower sidewall extending upwardly from the bottom surface, and a rim between the top and bottom surfaces and having a lower surface extending outwardly from the lower sidewall. A gas inlet may be located on the lower surface of the rim and arranged to be opened to admit pressurized gas into the cartridge to move a beverage medium in an internal space of the cartridge out of the cartridge. For example, the gas inlet may include a flow control element, such as an openable valve, that can be opened to allow pressurized gas into the internal space of the cartridge to force the beverage medium to exit the cartridge. In one embodiment, a portion of the rim may be pierceable to open the gas inlet. An indexing feature may be provided including a recess formed in the lower sidewall and located below the gas inlet to rotationally position the gas inlet of the cartridge relative to a cartridge holder. In this way, the cartridge and the gas inlet can be suitably positioned to open the gas inlet and admit pressurized gas into the cartridge. In one embodiment, the recess extends from the bottom surface to the rim.

In one embodiment, the beverage cartridge includes an upper portion including a first internal space containing a gas source, e.g., to release gas used to carbonate a beverage. The upper portion may include the top surface and an upper sidewall that extends downwardly from the top surface to the rim, e.g., the upper sidewall may flare downwardly and outwardly or have a frustoconical shape. A lower portion of the cartridge may include a second internal space containing the beverage medium, e.g., the lower portion may include the bottom surface and the lower sidewall extending upwardly from the bottom surface (the lower sidewall may flare upwardly and outwardly from the bottom surface). The rim may extend radially outwardly from the upper and lower sidewalls, e.g., to provide first and second clamping surfaces for engagement by a cartridge holder of a beverage making machine to define a pressure tight seal to contain pressurized gas emitted by the gas source. The first and second clamping surface may be upper and lower annular surfaces of the rim, respectively.

In some embodiments, the top surface is pierceable to access the gas source, e.g., an opening of the cartridge may be closed by a lid that is pierceable to admit activating fluid into the cartridge to cause the gas source to release gas and/or to allow gas from the gas source to exit the cartridge. In some cases, the upper portion may include a bottom wall that bounds a bottom of the first internal space of the upper portion, and separates the first internal space from the second internal space. The lower portion may include an outlet through which the beverage medium exits the second internal space, e.g., the outlet may be located at the bottom surface of the lower portion and may be pierceable to open the outlet.

In one embodiment, the gas inlet includes a protrusion extending downwardly from the lower surface of the rim, a hinge and a break region, arranged such that upward movement of the protrusion relative to the rim causes the protrusion to pivot about the hinge and cause the break region to detach and open the gas inlet. In some cases, the protrusion has a slope at a lower surface such that the protrusion is longer on a side opposite the hinge so as to concentrate a breaking force on the break region when the protrusion is moved upwardly relative to the rim. Upward movement of the protrusion may be caused by a piercing element of a cartridge holder contacting the protrusion and the cartridge being moved downwardly relative to the piercing element. In one embodiment, the gas inlet includes a D-shaped sealing region arranged around an inlet valve, with the D-shaped sealing region arranged to engage with a portion of a cartridge holder to form a gas-tight seal for admitting pressurized gas into the internal space. In one case, the hinge portion of the gas inlet is located at the straight side of the D-shaped sealing region. The cartridge may also include a gas path arranged to direct gas entering the cartridge at the gas inlet into the internal space. The gas path may include a restriction to resist movement of beverage medium in the cartridge to the gas inlet, e.g., so that a piercing element of the beverage machine at the gas inlet does not contact beverage medium.

In another aspect of the invention, a beverage cartridge includes a top surface, a bottom surface, a lower sidewall extending upwardly from the bottom surface, and a clamping structure between the top and bottom surfaces and having a lower surface extending outwardly from the lower sidewall. The clamping structure may be arranged for engagement with a cartridge holder of a beverage machine such that the cartridge holder can engage the clamping structure and force the cartridge into a brewing position in the cartridge holder. In some cases, the clamping structure may include a rim, ring or flange that extends continuously around the cartridge, or may include radially extending protrusions, such as ribs or tabs. A gas inlet may be located on the lower surface of the clamping structure and arranged to be opened to admit pressurized gas into the cartridge to move a beverage medium in an internal space of the cartridge out of the cartridge. For example, the gas inlet may include a flow control element, such as an openable valve located at a radial protrusion that can be opened to allow pressurized gas into the internal space of the cartridge to force the beverage medium to exit the cartridge. An indexing feature may be provided including a recess formed in the lower sidewall and located below the gas inlet to rotationally position the gas inlet of the cartridge relative to a cartridge holder. In this way, the cartridge and the gas inlet can be suitably positioned to open the gas inlet and admit pressurized gas into the cartridge. In one embodiment, the recess extends from the bottom surface to the clamping structure.

In another aspect of the invention, a beverage cartridge for forming a carbonated beverage includes an upper portion including a top surface, an upper sidewall extending downwardly from the top surface and a first internal space containing a gas source. A lower portion of the cartridge includes a bottom surface, a lower sidewall extending upwardly from the bottom surface, and a second internal space containing a beverage medium. A rim may be spaced from and positioned between the top and bottom surfaces, with the rim extending radially outwardly beyond the upper and lower sidewalls. The rim may provide first and second clamping surfaces for engagement by a cartridge holder of a beverage making machine to define a pressure tight seal to contain pressurized gas emitted by the gas source. A gas inlet may be located at an underside of the rim and arranged to admit pressurized gas into the second internal space to urge the beverage medium out of the second internal space, e.g., through an outlet at the bottom surface. In one embodiment, the upper portion includes an upper rim portion, the lower portion includes a lower rim portion, and the upper and lower rim portions are joined together to form the rim. A coupling member may be attached to the upper and lower rim portions so as to join the upper and lower portions together. As discussed above, the cartridge may include other features, such as an indexing recess in the lower portion sidewall located below the gas inlet.

In some embodiments, the first and second internal spaces of the cartridge may each have a volume that is less than a volume of carbonated beverage to be formed using the cartridge portions. This can provide a significant advantage by allowing a user to form a relatively large volume beverage using a relatively small volume cartridge or cartridges. For example, the system may be arranged to use the first and second cartridge portions over a period of time less than about 120 seconds to form a carbonated liquid having a volume of between 100-1000 ml and a carbonation level of about 1 to 5 volumes. Carbonation may occur at pressures between 20-50 psi, or more. The cartridge portions in this embodiment may have a volume of about 60 ml or less, reducing an amount of waste and/or adding to convenience of the system.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

Figure 1A:
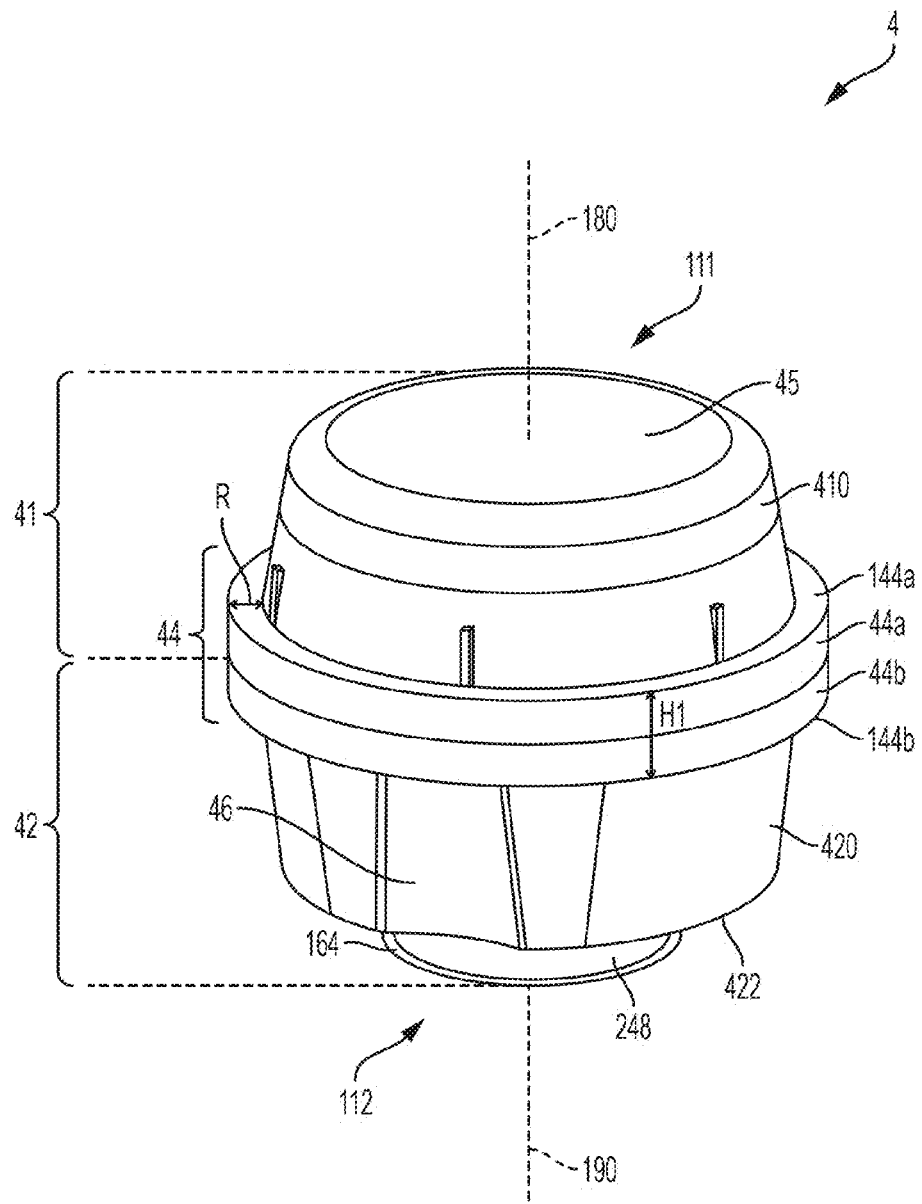
FIG. 1A shows a perspective view of an illustrative embodiment of a beverage cartridge.

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with one aspect of the invention, a cartridge includes a top surface, a bottom surface, a sidewall that extends between the top and bottom surfaces, and a rim or other clamping structure positioned between the top and bottom surfaces that extends outwardly from the sidewall and provides one or more clamping surfaces for engagement by a cartridge holder. For example, the clamping structure may include upper and lower surfaces that are engaged by the cartridge holder to hold the cartridge in place. One or both of the upper and lower surfaces may be engaged so as to form a pressure tight seal, e.g., by contact with an o-ring or other gasket of the cartridge holder. Providing the clamping structure between the top and bottom surfaces may allow for the location of two or more separate internal spaces or compartments of the cartridge to be positioned in areas of differing pressure. For example, in one embodiment, an upper portion of the cartridge may include a gas source that releases gas under pressure and the upper portion may be held in a relatively high pressure space by the cartridge holder. In contrast, a lower portion of the cartridge may contain a beverage medium and be held in a relatively low pressure space, e.g., to allow the beverage medium to be expelled from the cartridge.

Thus, according to one aspect, a cartridge may include a first portion having a first internal space and a second portion having a second internal space. The first internal space may contain a gas source arranged to emit gas for use in dissolving into precursor liquid, e.g., for carbonating the precursor liquid, and the second internal space may contain a beverage medium arranged to be mixed with liquid precursor to form a beverage. The first internal space containing the gas source may be isolated from the second internal space in which the beverage medium is contained. A fluid (such as water, water vapor, or other) may be provided to the first portion containing the gas source so as to cause the gas source to emit gas that is used to carbonate precursor liquid or otherwise dissolve in the precursor liquid. Pressurized gas, such as air, may be delivered to the second portion containing the beverage medium to move the beverage medium out of the second internal space of the second portion for mixing with a precursor liquid. Alternately, precursor liquid may be supplied to the second portion by a beverage making system for mixing with the beverage medium. The first portion may have a top surface that can be pierced to form an inlet into the first internal space. The second portion may have a gas inlet having a flow control element located at the underside of the rim, e.g., to admit pressurized gas to force or otherwise cause beverage medium to exit the second portion.

In accordance with one aspect of the invention, a fluid (such as water, water vapor, or other) may be provided to a carbon dioxide or other gas source in a cartridge so as to cause the gas source to emit gas that is used for carbonation or otherwise for dissolution in a liquid. In one embodiment, a beverage making machine may include a gas activating fluid supply arranged to provide fluid to a cartridge chamber for contact with the gas source so as to cause the gas source to emit gas. In other arrangements, the gas source may be caused to release gas in other ways, such as by heating, exposing the source to microwaves or other electromagnetic radiation, etc. A gas supply of the machine may be arranged to conduct gas emitted by the gas source, under pressure greater than the ambient pressure, to a precursor liquid to carbonate the precursor liquid. In some embodiments, the gas source may be in solid form, such as a zeolite, activated carbon or other molecular sieve that is charged with carbon dioxide or other gas, and the use of a cartridge may not only isolate the gas source from activating agents (such as water vapor in the case of a charged zeolite), but also potentially eliminate the need for a user to touch or otherwise directly handle the carbon dioxide source.

According to another aspect of the invention, a volume or other measure of the fluid provided to the cartridge may be controlled to control the rate or amount of gas that is produced by the gas source. This aspect can make the use of some gas sources, such as a charged zeolite material, possible without requiring gas storage or high pressure components, although high pressure gas cylinders can be used as a gas source with some embodiments. For example, zeolites charged with carbon dioxide tend to release carbon dioxide very rapidly and in relatively large quantities (e.g., a 30 gram mass of charged zeolite can easily produce 1-2 liters of carbon dioxide gas at atmospheric pressure in a few seconds in the presence of less than 30-50 ml of water). This rapid release can in some circumstances make the use of zeolites impractical for producing relatively highly carbonated liquids, such as a carbonated water that is carbonated to a level of 2 volumes or more. (A carbonation "volume" refers to the number of volume measures of carbon dioxide gas that is dissolved in a given volume measure of liquid. For example, a 1 liter amount of "2 volume" carbonated water includes a 1 liter volume of water that has 2 liters of carbon dioxide gas dissolved in it. Similarly, a 1 liter amount of "4 volume" carbonated water includes a 1 liter volume of water that has 4 liters of carbon dioxide dissolved in it. The gas volume measure is the gas volume that could be released from the carbonated liquid at atmospheric or ambient pressure and room temperature.) That is, dissolution of carbon dioxide or other gases in liquids typically takes a certain amount of time, and the rate of dissolution can only be increased a limited amount under less than extreme conditions, such as pressures within about 150 psi of ambient and temperatures within about +/−40 to 50 degrees C. of room temperature. By controlling the rate of carbon dioxide (or other gas) production for a carbon dioxide (or other gas) source, the total time over which the carbon dioxide (or other gas) source emits carbon dioxide (or other gas) can be extended, allowing time for the carbon dioxide (gas) to be dissolved without requiring relatively high pressures. For example, when employing one illustrative embodiment incorporating one or more aspects of the invention, the inventors have produced liquids having at least up to about 3.5 volume carbonation levels in less than 60 seconds, at pressures under about 40 psi, and at temperatures around 0 degrees Celsius. Of course, as discussed above and elsewhere herein, aspects of the invention are not limited to use with carbon dioxide, and instead any suitable gas may be dissolved in a liquid in accordance with all aspects of this disclosure.

In another aspect of the invention, a portion of a precursor liquid that is used to form a beverage may be used to activate the gas source. This feature may help simplify operation of a beverage making machine, e.g., by eliminating the need for special activation substances. As a result, a beverage making machine, or a method of forming a sparkling beverage, may be made less expensively and/or without special purpose ingredients. For example, in the case of a machine making carbonated water, all that is needed to activate the carbon dioxide source may be a portion of the water used to form the beverage. It should be understood, however, that other aspects of the invention need not require the use of a portion of precursor liquid to activate a carbon dioxide source, and instead may use any suitable activating agent, such as a citric acid in aqueous form that is added to a bicarbonate material, heat, microwave or other electromagnetic radiation used to activate a zeolite source, and others. For example, the cartridge that includes the carbon dioxide source may include (as part of the source) an activating agent whose addition to another component of the carbon dioxide source is controlled to control carbon dioxide production.

Figure 1B:
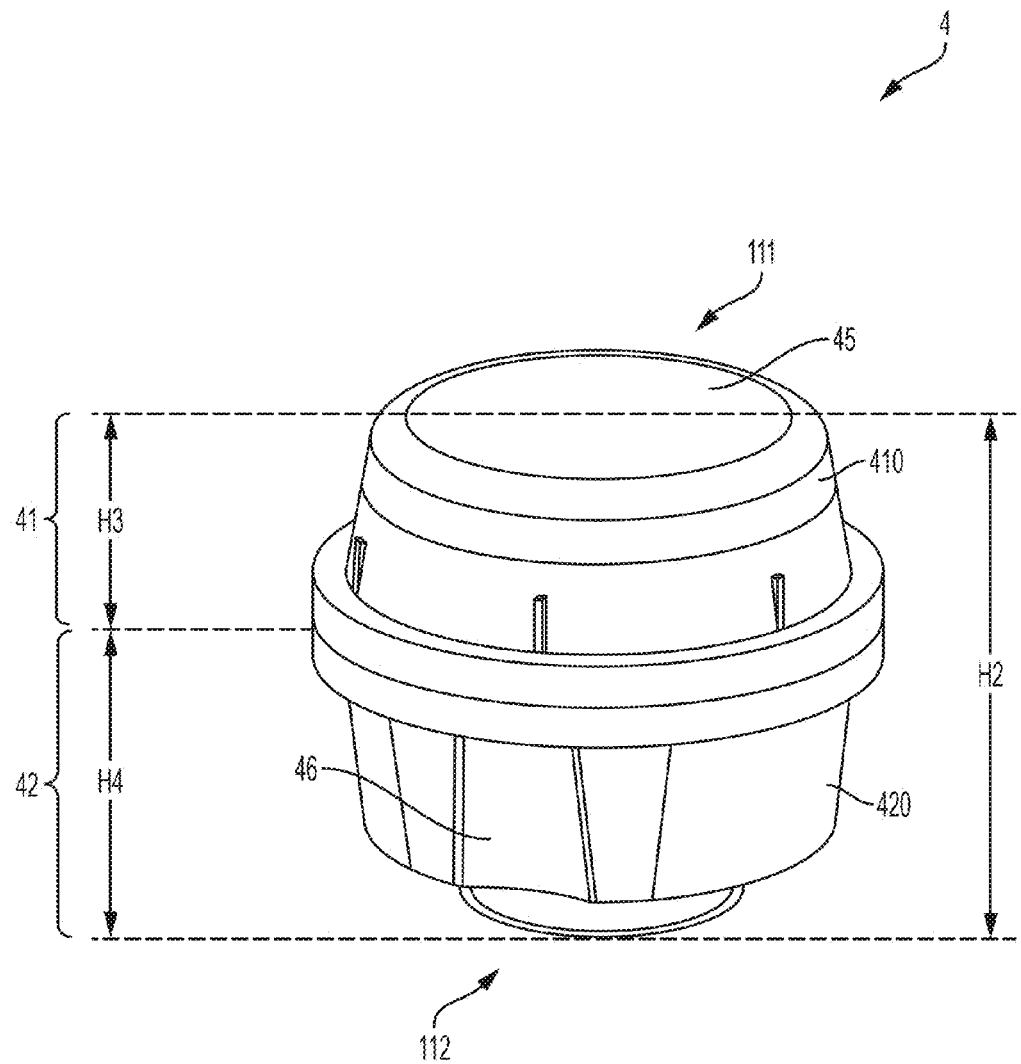
FIG. 1B shows a perspective view of the cartridge of FIG. 1A annotated with dimensions.
Figure 2:
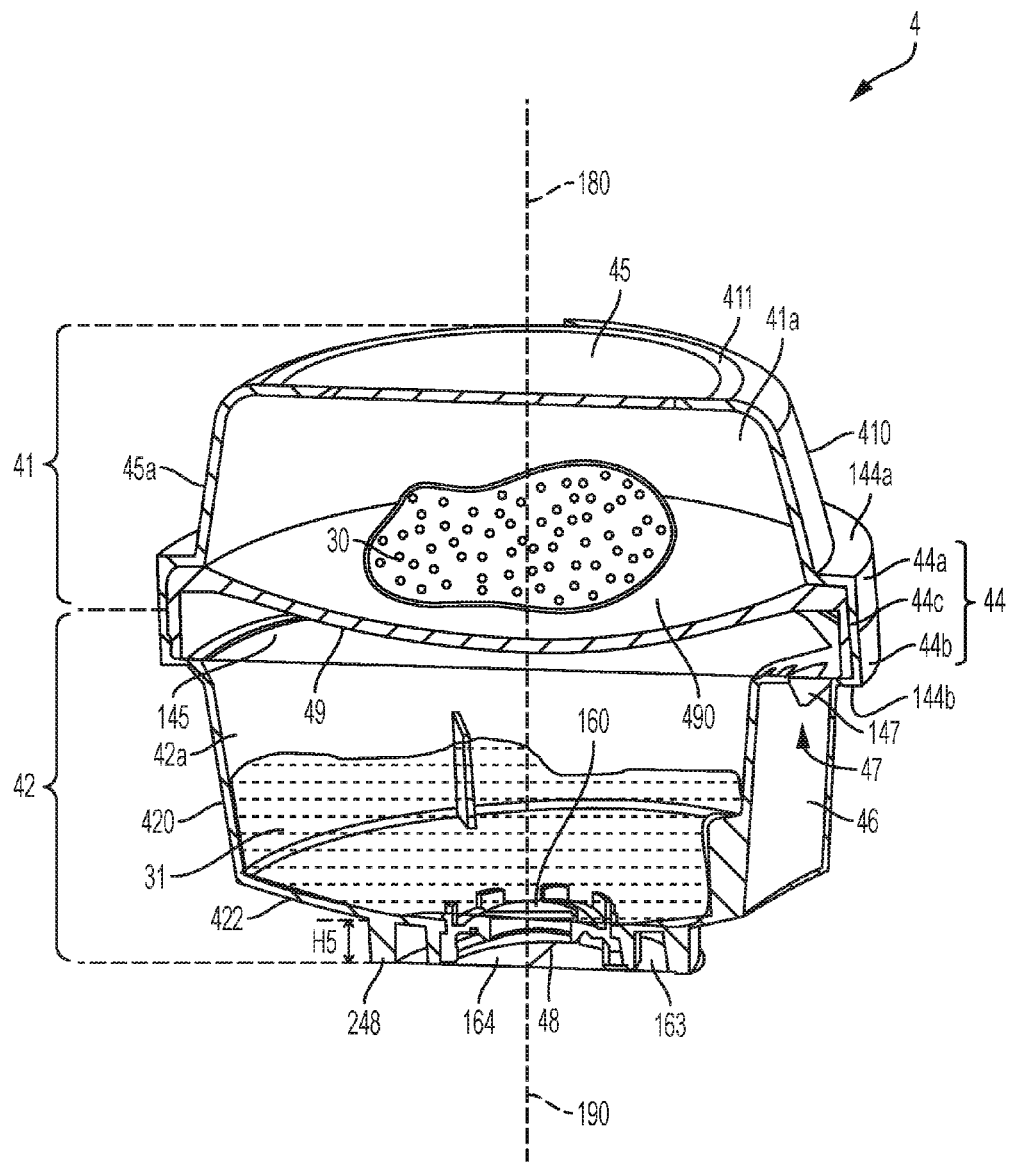
FIG. 2 shows a cross-sectional view of the FIG. 1A cartridge.
Figure 3:
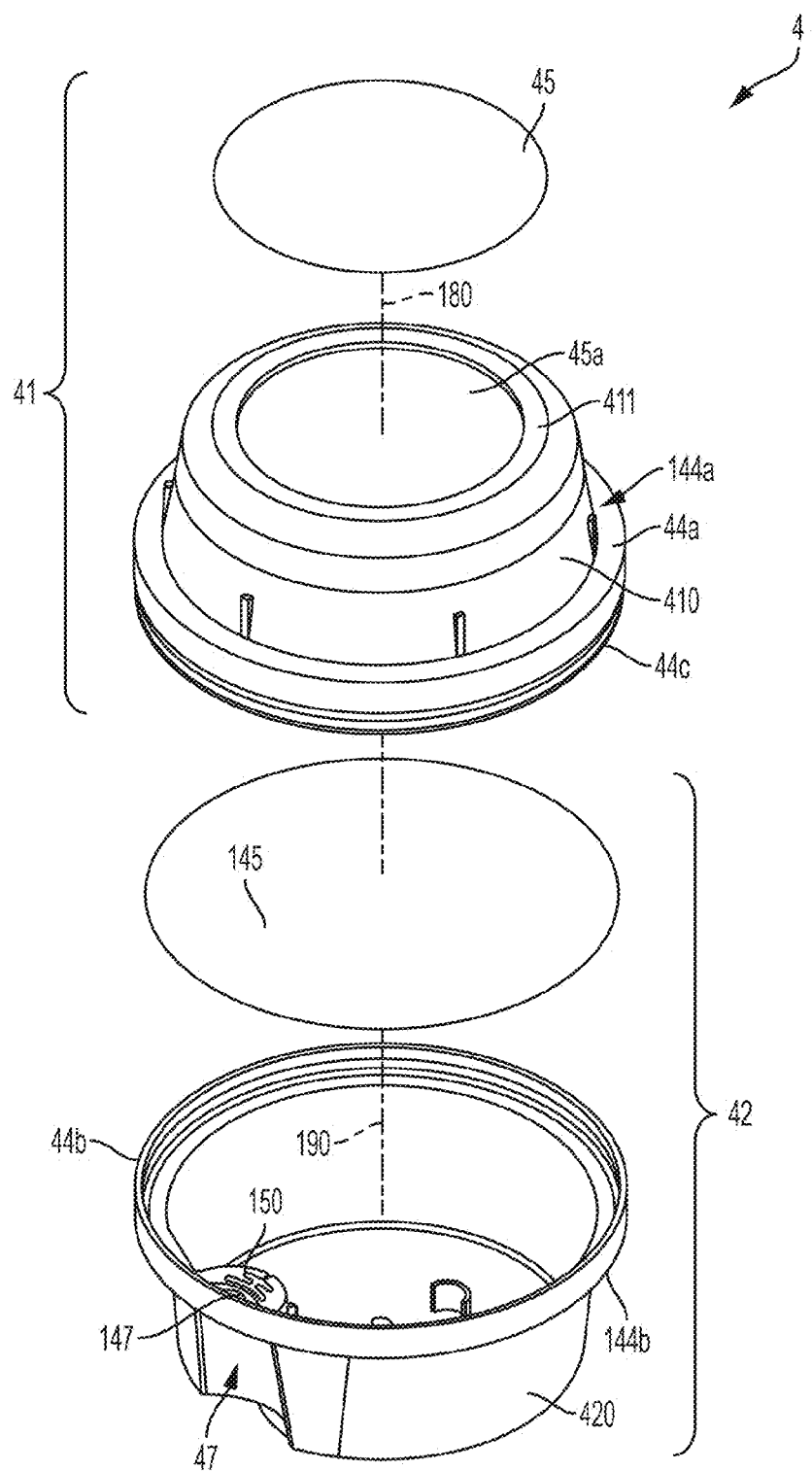
FIG. 3 shows an exploded view of the FIG. 1A cartridge.
Figure 4:
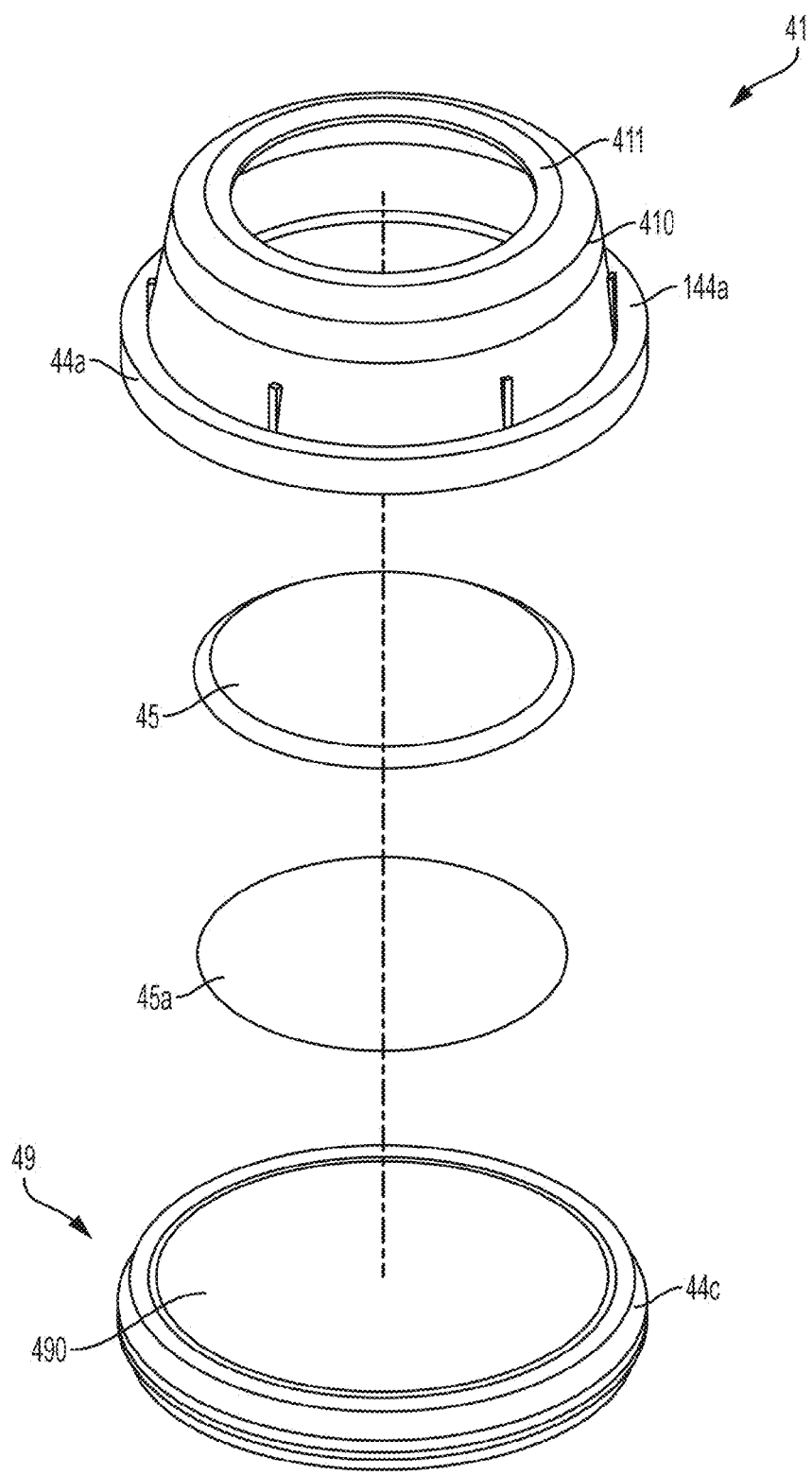
FIG. 4 shows an exploded view of the upper portion of the FIG. 1A cartridge.

FIGS. 1-3 show an illustrative embodiment of a beverage cartridge 4 that incorporates one or more aspects of the invention. The cartridge has a top surface 111 and a bottom surface 112 with a height H2 (see FIG. 1B). The height H2 of the cartridge 4 may range from 55 to 60 mm, though other values are possible. The cartridge 4 has a maximum diameter that may range from 61 to 63 mm in this illustrative embodiment. A clamping structure, in this case a rim 44, is located between the top and bottom surfaces 111, 112 and includes portions that extend radially outwardly and beyond a sidewall 410, 420 of the cartridge 4. The rim 44 has upper and lower surfaces 144a, 144b and a circumferential portion 44a, 44b that extends axially from a radially outer end of the upper and lower surfaces 144a, 144b. As discussed in more detail below, the rim 44 or other clamping structure may provide a support for the cartridge 4 that can be engaged by a cartridge holder of a beverage machine, e.g., to clamp the cartridge in place for piercing the top and/or bottom surface 111, 112 to access an interior space of the cartridge 4, to establish a pressure tight seal with the cartridge 4, or otherwise hold the cartridge as needed to form a beverage. (The terms "rim" and "band" can be used interchangeably to refer to element 44.)

In this embodiment, the cartridge has an upper portion 41 and a lower portion 42, which may respectively define upper and lower internal spaces in which a gas source or beverage medium may be contained. However, as described in alternative embodiments below, a cartridge need not have two portions, but may have one or more than two, and the portions may be located in any suitable way with respect to the rim 44. In some embodiments, the internal spaces of the upper and/or lower portions may be divided into two or more chambers. For example, contents held within the lower portion (and/or upper portion) may be held in two or more separate sections so that different types of contents can be stored separately and dispensed together. As one example of a potential benefit, such an arrangement may be useful in the case of substances that cannot be mixed together and stored for long periods due to degradation or for other incompatibility issues.

In this embodiment, the upper portion 41 has an upper sidewall 410 that extends downwardly from the top surface 111 to the rim 44, and the lower portion 42 has a lower sidewall 420 that extends upwardly from the bottom surface 112 to the rim 44. As can be seen, the rim 44 is spaced from the top surface 111 and from the bottom surface 112, and protrudes radially outwardly from the lower end of the upper sidewall 410 and the upper end of the lower sidewall 420, proud to the outer surface of the sidewalls 410, 420. As such, the rim 44 extends radially outwardly beyond the upper and lower sidewalls 410, 420. The rim 44 in this embodiment has a radial thickness R and a height H1 which may be adjusted as desired to provide needed strength, a suitably sized clamping area, needed gas or other flow paths, needed space for movement of a gas inlet flow control element, and/or other features. The rim 44 in this case has clamping surfaces for engagement by a cartridge holder of a beverage making system at a top, upwardly facing surface 144a (a first clamping surface) and a bottom, downwardly facing surface 144b (a second clamping surface). In some embodiments, clamping of the rim 44 at one or both of the clamping surfaces 144a, 144b by the cartridge holder creates a pressure tight seal to contain pressurized gas emitted by a gas source contained within the cartridge, as will be discussed. In this embodiment, the rim 44 has an annular shape that extends around a circumference of the cartridge, e.g., the clamping surfaces 144a, 144b have an annular shape, but the rim 44 may have a different shape, such as semicircular shape in vertical cross section. That is, in this embodiment and as can be seen in the vertical cross sectional view of FIG. 2, the rim 44 has a rectangular shape including the horizontally oriented surfaces 144a, 144b and the circumferential portion 44a, 44b extending axially between the outer ends of the surfaces 144a, 144b. However, the rim 44 could have a semi-circular shape, e.g., with the surfaces 144a, 144b defining a quarter-circle arcuate shape, a partial oval shape, a triangular shape, or others. In this embodiment, the clamping surfaces 144a, 144b are substantially horizontal relative to the vertical axis 180 of the cartridge 4. However, other arrangements may be possible, e.g., the clamping surfaces 144a, 144b may be oblique to the vertical axis 180 of the cartridge 4.

Assembly of the rim 44 and other portions of the cartridge 4 may depend on the cartridge configuration, and can be performed in a variety of different ways. For example, in this embodiment, the top surface 411 and upper sidewall 410 of the upper portion 41 is a first component and the bottom surface 422 and lower sidewall 420 of the lower portion 42 is a second component. The two components are initially made as separate components that are joined together to form the rim 44. That is, in this illustrative embodiment and as seen in FIG. 2, the upper portion 41 includes an upper rim portion (which includes the upper surface 144a and circumferential portion 44a), which is attached to a bottom end of the upper sidewall 410. The upper rim portion is coupled to the lower portion 42 via a lower rim portion (which includes the lower surface 144b and circumferential portion 44b), which is attached to an upper end of the lower sidewall 420. With the upper and lower portions 41, 42 coupled together, the rim 44 is formed.

However, this arrangement is not required for the rim 44. Alternatively, the rim 44 or other clamping structure may be one or more components that are formed separately from, and later attached to, the upper and lower portions 41, 42. For example, in one illustrative embodiment, the sidewalls 410, 420, of the upper and lower portions 41, 42 may be attached directly to each another, and the rim 44 may be attached over the joined sidewalls. In another arrangement, the upper and lower portions 41, 42 may be formed as a single continuous body (as opposed to the upper and lower portions 41, 42 being formed initially as separate components), and the rim 44 may attached to the sidewall of the body, e.g., by encircling a circumference of the body sidewall, or the rim 44 may be formed as a single unitary part with the body sidewall. In yet another embodiment, the rim 44 may be formed as a solid or hollow disc or puck (e.g., a cylinder having a height H1). An upper portion 41 of the beverage cartridge 4 may be attached to a top of the disc or puck and a lower portion 42 may be attached to a bottom of the disc or puck, such that the disc or puck is sandwiched between the upper and lower portions 41, 42. The diameter of the puck may be greater than that of the upper and lower portions, such that an outer portion of the puck extends beyond the sidewalls of the upper and lower portions to define the rim 44.

In yet other embodiments, the rim 44 or other clamping structure may be removably attachable to a cartridge, e.g., which may include upper and lower portions 41, 42. In one illustrative embodiment, the rim 44 is reusable with different cartridges. For example, a first cartridge portion may have upper and lower portions 41, 42 attached together, although provided without a rim 44. A user may then attach the rim 44 the upper and/or lower portions 41, 42 before inserting the assembled combination into a beverage making system. For example, where the rim 44 is formed as a solid puck that is sandwiched between upper and lower portions 41, 42, the user may attach the upper and lower portions 41, 42 to the puck and then place the assembly in a cartridge holder. After forming a beverage using the contents of the upper and/or lower portions 41, 42, the user may remove the rim 44 from the upper and lower portions 41, 42 and reuse the rim 44 for another set of upper and lower portions 41, 42 to form a subsequent beverage. Alternatively, the rim 44 may be first inserted into the cartridge holder of the beverage making system and the set of upper and lower portions 41, 42 (or other cartridge sections) may be inserted into the rim 44.

Engagement of cartridge portions with a clamping structure may be done by interference fit, a bayonet connection, adhesive, clamp, or other. For example, in one embodiment, where the rim 44 is hoop-shaped, the rim 44 attaches to the upper and lower portions 41, 42 by slipping the hoop-shaped rim 44 over one of the ends of the upper and lower portions 41, 42 until the rim 44 engages with the upper and/or lower portion 41, 42 in an interference fit, via a mechanical interlock, adhesive, welding, and/or other suitable attachment arrangement. In another example, the rim 44 may be comprised of multiple pieces, such as two semi-circle halves that may be brought together around the upper and/or lower portions 41, 42 and assembled into a complete ring to encircle the circumference of the upper and/or lower portions 41, 42. The rim 44 may then attach to the upper and/or lower portions 41, 42 via an interference fit, mechanical interlock, or other suitable attachment arrangement. In another illustrative embodiment, where the rim is the outer portion of a circular puck that is sandwiched between an upper portion 41 and a lower portion 42, the upper and lower portions may engage with the puck via a mechanical interlock, adhesive, welding, or other suitable attachment arrangement.

Of course, other clamping structure configurations may be attached to a cartridge in other ways. For example, in one embodiment, the clamping structure may include one or more tabs or protrusions that extend radially outwardly from the upper and/or lower portion 41, 42. These protrusions may be arranged like spokes or other elements that can be engaged by a cartridge holder to hold the cartridge in place. The protrusions may be formed as a unitary part with the upper and/or lower portions 41, 42 or other cartridge element, or may be made separately and later attached, e.g., by welding, adhesive, etc. In one case, the protrusions may include arcuate sections that each extend around a portion of the cartridge, but are separate from each other so as to provide gaps between the protrusions in an arcuate direction. In other embodiments, the clamping structure may include rods, pins or other elements positioned around the cartridge to provide a clamping surface.

In the illustrative embodiment shown in FIG. 2, the upper portion 41 is attached over the lower portion 42. In some embodiments, the upper portion 41 includes an upper internal space 41*a* that overlies a lower internal space 42*a* of the lower portion 42. For example, the upper and lower internal spaces 41*a*, 42*a* may both be rotationally symmetric relative to a vertical axis 180 of the cartridge 4. However, this arrangement is not required, and the upper internal space 41*a* may overlie only part of the lower internal space 42*a* (e.g., such that a vertical axis can pass through both the first internal space 41*a* and the second internal space 42*a*), or may not overlie any part of the lower internal space 42*a*. In this embodiment, the first internal space 41*a* is isolated from the second internal space 42*a*, e.g., so a gas source 30 is separated from a beverage medium 31.

The shape, size or other configuration of the upper and/or lower portions 41, 42 may be altered as desired, at least in some embodiments. In the illustrative embodiment shown in FIGS. 1-3, the upper portion 41 has a top wall 411, a bottom wall 49 and a sidewall 410 extending between the top and bottom walls. The top wall 411, bottom wall 49 and sidewall 410 define boundaries of a volume of the upper portion 41. The upper portion 41 has a substantially frustoconical shape such that the sidewall 410 flares downwardly and outwardly from the top wall 411, e.g., the top of the substantially frustoconical shape has a smaller diameter than that of the bottom of the substantially frustoconical shape. That is, the sidewall 410 may extend downwardly from the top wall 411 and flare outwardly away from the vertical axis 180. The top wall 411 and the sidewall 410 may be made in any suitable way, e.g., as a single monolithic component having the same, or different, wall thickness, or may be made as separate parts of the same or different material that are joined together. In this embodiment, a portion of the top wall 411 and the sidewall 410 are molded as a single part such that an outer, peripheral section of the top wall 411 curves downwardly and transitions to the sidewall 410. However, this arrangement is not required, e.g., the top wall 411 and sidewall 410 may be joined at a sharp angle or together may define a gradually curved configuration such as an overall dome shape. As seen in FIG. 1B, the upper portion 41 has a height H3, which may range from 23 to 25 mm in this illustrative embodiment.

Similar to the upper portion 41, the lower portion 42 may be arranged in a variety of different sizes, shapes and/or other configurations, at least in some embodiments. In the illustrated arrangement, the lower portion 42 has a top surface 145, a bottom wall 422 and a sidewall 420 extending between the top surface and bottom wall. The top surface 145, bottom wall 422 and sidewall 420 define boundaries of a volume of the lower portion 42. The lower portion 42 has a substantially frustoconical shape such that the sidewall 420 flares upwardly and outwardly from the bottom wall 422, e.g., the top of the substantially frustoconical shape has a larger diameter than that of the bottom of the frustoconical shape. That is, the lower portion 42 has a sidewall 420 that extends upwardly from the bottom wall 422 and flares outwardly away from a vertical axis 180 of the cartridge 4. In some embodiments, such as the embodiment shown in FIG. 2, the lower portion 42 may be rotationally symmetric about a vertical axis 190 that is coincident with the vertical axis 180 of the cartridge 4. In some embodiments, the vertical axis 180 may pass through a centerpoint of the top wall 411 of the cartridge and the centerpoint of the bottom wall 422 of the cartridge. The bottom wall 422 and the sidewall 420 may be made in any suitable way, e.g., as a single monolithic component having the same, or different, wall thickness, or may be made as separate parts of the same or different material that are joined together. In this embodiment, a portion of the bottom wall 422 and the sidewall 420 are molded as a single part such that an outer, peripheral section of the bottom wall 422 curves upwardly and transitions to the sidewall 420. However, this arrangement is not required, e.g., the bottom wall 422 and sidewall 420 may be joined at a sharp angle or together may define a gradually curved configuration such as an overall dome shape. As seen in FIG. 1B, the lower portion 42 has a height H4, which may range from 31 to 34 mm in this embodiment.

The cartridge can have an outlet arranged in different ways so that beverage medium in the cartridge can be released and mixed with a precursor liquid to form a beverage. For example, as seen in FIG. 2, in this embodiment, the lower portion 42 includes an outlet 48 arranged at the bottom wall 422. Also, while the outlet 48 may be arranged as simply as an opening in the bottom wall 422, in this embodiment, outlet components are housed at least partially within a protrusion 248 that extends downwardly from the bottom wall 422. As will be explained in more detail below, the protrusion 248 may aid in supporting an outlet membrane or cover and piercing of the membrane/cover to open the outlet 48. In this embodiment, the protrusion 248 protrudes out from the bottom wall 422 by a height H5 (see FIG. 2) which may range from 3 to 6 mm. The protrusion 248 may have a width smaller than that of the bottom wall 422 and may be rotationally symmetric about a vertical axis 190 of the lower portion 42. The protrusion 248 may house components, such as an outlet valve, as will be discussed in more detail below. In some embodiments, as will be discussed in further detail below, a membrane or covering 164 is located at the bottom end of the protrusion 248. This covering 164 may be pierced to open the outlet 48, thereby permitting beverage medium to exit the lower portion 42. In some embodiments, outlet 48 may include more than one opening.

In some embodiments, the top surface of the cartridge may be pierceable to access the gas source in the upper portion 41. For example, a piercing element may form one or more openings in the top surface 111 so that a fluid may be provided into the internal space and/or so that gas emitted by the gas source can exit the internal space. In this embodiment, the top surface 111 of the upper portion 41 and the cartridge 4 includes a lid 45 that covers an opening of the upper portion 41. The lid 45 is pierceable to form one or more openings so as to access a gas source 30 in the upper portion 41. In some embodiments, the opening of the upper portion 41 may be smaller in diameter than the top of the upper portion 41, and the lid 45 may be larger in size than the opening such that an outer portion of the lid 45 may overlap with a portion of the top wall 411 of the upper portion 41. In this embodiment, the lid 45 is attached to the top surface of the top wall 411, but in other embodiments, the lid 45 may be attached to an inner side of the top wall 411. The lid 45 may be heat sealed, adhered, or otherwise attached to the top wall 411 of the upper portion 41. Of course, the lid 45 may have any suitable size and/or shape, which may depend on the size and/or shape of the opening, e.g., the lid 45 may be circular to cover the opening of the upper portion 41. The lid 45 may be made of foil/polymer laminate or other flexible sheet material. Of course, the use of a lid 45 is not required, and instead material used to form the top wall 411 may be itself pierced to access the gas source. In some embodiments, the top wall 411 spans the entire top of the cartridge and the top wall 411 may include one or more small holes. In an embodiment with more than one small hole, the small holes may each be covered with separate pieces of pierceable material that each serve as lids. Alternatively, a single piece of pierceable material may cover two or more holes and serves as a lid. In other arrangement, valves or ports may be provided at the top wall 411 and/or sidewall 410 as desired.

In one aspect of the invention, a filter in the internal space of the cartridge may define a gas outlet chamber that is located below the pierceable top surface of the cartridge. The gas outlet chamber may be separated from the gas source such that gas emitted by the gas source must pass through the filter to enter the gas outlet chamber, and thus exit the cartridge. This arrangement may help prevent unwanted exit of gas source materials from the cartridge. In the illustrated embodiment, as seen in FIG. 2, a filter 45a may be positioned below the lid 45, e.g., spaced apart from the lid 45 but substantially parallel to the lid 45. However, in other embodiments, the filter 45a may be positioned in contact with an inner surface of the lid 45 such that the gas outlet chamber between the filter 45a and the lid 45 is defined as the very narrow space between the filter 45a and the lid 45. In some arrangements, the filter is arranged for contact with a piercing element that pierces the top surface to create an outlet opening through which gas emitted by the gas source exits the first internal space. For example, the filter may be arranged to move away from the top surface with contact of the filter with the piercing element. This movement may help to enlarge a gas outlet chamber, as needed, as well as resist piercing of the filter 45a itself. Thus, the filter 45a may be made to be pierce-resistant so that the filter 45a retains its ability to separate gas (which enters the gas chamber through the filter 45a) from gas source material. The filter 45a may be larger in size than the opening of the upper portion 41 such that an outer portion of the filter 45a may overlap with a portion of the top wall 411 of the upper portion 41. In this embodiment, the filter 45a is attached to the underside of the upper portion top wall 411, which serves as a standoff or protrusion such that the filter 45a is suitably spaced from the lid 45. The filter 45a may be made of any suitable material, such as a paper and/or polymer-based filter paper.

As noted above, the first and second internal spaces 41a, 42a may be separated from each other, e.g., by a bottom wall 49 that defines a bottom portion of the first internal space 41a. In some embodiments, the bottom wall 49 has a dome shape. In the illustrated embodiment, the bottom wall 49 has a central portion 490 and a peripheral portion 44c. In this embodiment, the central portion 490 includes a curved surface that is concave up, but such a shape is not necessary, e.g., the central portion 490 may be flat or concave down. The peripheral portion 44c of the bottom wall 49 is employed to join the upper and lower rim portions of the first and second portions 41, 42. That is, the peripheral portion 44c has a downwardly extending portion located at an outer periphery of the central portion 490. The downwardly extending portion of the peripheral portion 44c may be substantially vertical, or may be angled relative to the vertical axis 180 of the upper portion 41.

The peripheral portion 44c of the bottom wall 49 serves as a coupling member that couples the upper portion 41 to the lower portion 42. As used herein, the terms "connected," "attached," or "coupled" are not limited to a direct connection, attachment, or coupling, as two components may be connected, attached, or coupled to one another via intermediate components.

In some embodiments, the coupling member is attached to the upper rim portion (which includes the upper surface 144a and circumferential portion 44a) and the lower rim portion (which includes the lower surface 144b and circumferential portion 44b). In some embodiments, the coupling member is attached to the circumferential portions 44a, 44b. As best seen in FIG. 2, the inwardly facing surfaces of the circumferential portions 44a, 44b are coupled to the outwardly facing surface of the peripheral portion 44c of the bottom wall 49. That is, the peripheral portion 44c may function as a bridge to join the circumferential portions of the upper and lower portions 41, 42. In some embodiments, the outwardly facing surface of the peripheral portion 44c includes threads, and the inwardly facing surfaces of the circumferential portions 44a and 44b also include threads, grooves, or ridges to engage with complementary threads, grooves or ridges of the peripheral portion 44c. These complementary locking features may engage with each other, e.g., by way of a snap fit, to engage the upper and lower portions 41, 42 and the peripheral portion 44c together. In some embodiments, an adhesive, heat seal, heat weld, or other suitable bonding technique may be used to reinforce the attachment between the circumferential portions 44a, 44b to the peripheral portion 44c.

It should be appreciated that other arrangements for coupling the circumferential portions 44a, 44b to peripheral portion 44c are possible. For example, instead of or in addition to threads, an interference fit, physical interlock, an overwrap, adhesive, heat sealing/welding, or other suitable arrangement may be used to couple the circumferential portions 44a, 44b to the peripheral portion 44c and/or to one another.

In some embodiments, the upper and lower portions 41, 42 can be reversibly coupled together. For example, the upper and lower portions may reversibly couple to a coupling member such as the peripheral portion 44c or to each other via a threaded engagement, snap fit, bayonet connection, or other. In some cases, a weak adhesive may be used to maintain engagement between the upper and lower portions 41, 42, but the adhesive may be easily overcome by a user twisting, pulling or otherwise moving the portions relative to one another or relative to a coupling member. The adhesive would be weak enough to permit decoupling of the portions from one another or from a coupling member without permanent deformation and/or tearing of the portions or coupling member. In other embodiments, the upper and lower portions are permanently coupled together such that any attempt to decouple the portions from one another would result in permanent deformation and/or tearing of the portions or coupling member. Such separation may be useful, for example, when composting or otherwise recycling portions of the cartridge.

In some embodiments, the top of the lower portion 42 includes a lid 145 that covers an opening of the lower portion 42. The lid 145 may provide different functions, such as closing the second internal space 42a after a beverage medium is placed in the lower portion 42. This way, the beverage medium may be captured in the second internal space 42a for subsequent assembly steps, such as joining the lower portion 42 to the peripheral portion 44c and the upper portion 41. Alternately, or in addition, the lid 145 may cover a gas inlet 47 and help control flow of gas into the second internal space 42a. The lid 145 may be larger in size than the opening such that an outer portion of the lid 145 overlaps with at least a portion of the top surface of the lower rim portion. The lid 145 is heat sealed, adhered or otherwise attached to the top of the lower rim portion, and may have any suitable shape to cover the opening of the lower portion 42. The lid 145 may be made of foil, polymer, or other flexible material such as a foil/polymer laminate. The lid 145 may be die cut, stamped, molded, or formed by any other suitable method.

The lower portion of the cartridge can have an inlet arranged in different ways so that pressurized gas or liquid can be introduced into the lower internal space of the cartridge to move a beverage medium out of the outlet to form a beverage. In some embodiments, pressurized gas is introduced through the lower portion inlet to move the beverage medium out of the cartridge to be mixed with precursor liquid outside of the cartridge. In another embodiment, precursor liquid is introduced through the lower portion inlet to both mix with the beverage medium and to move the beverage medium out of the cartridge to form a beverage.

Figure 5:
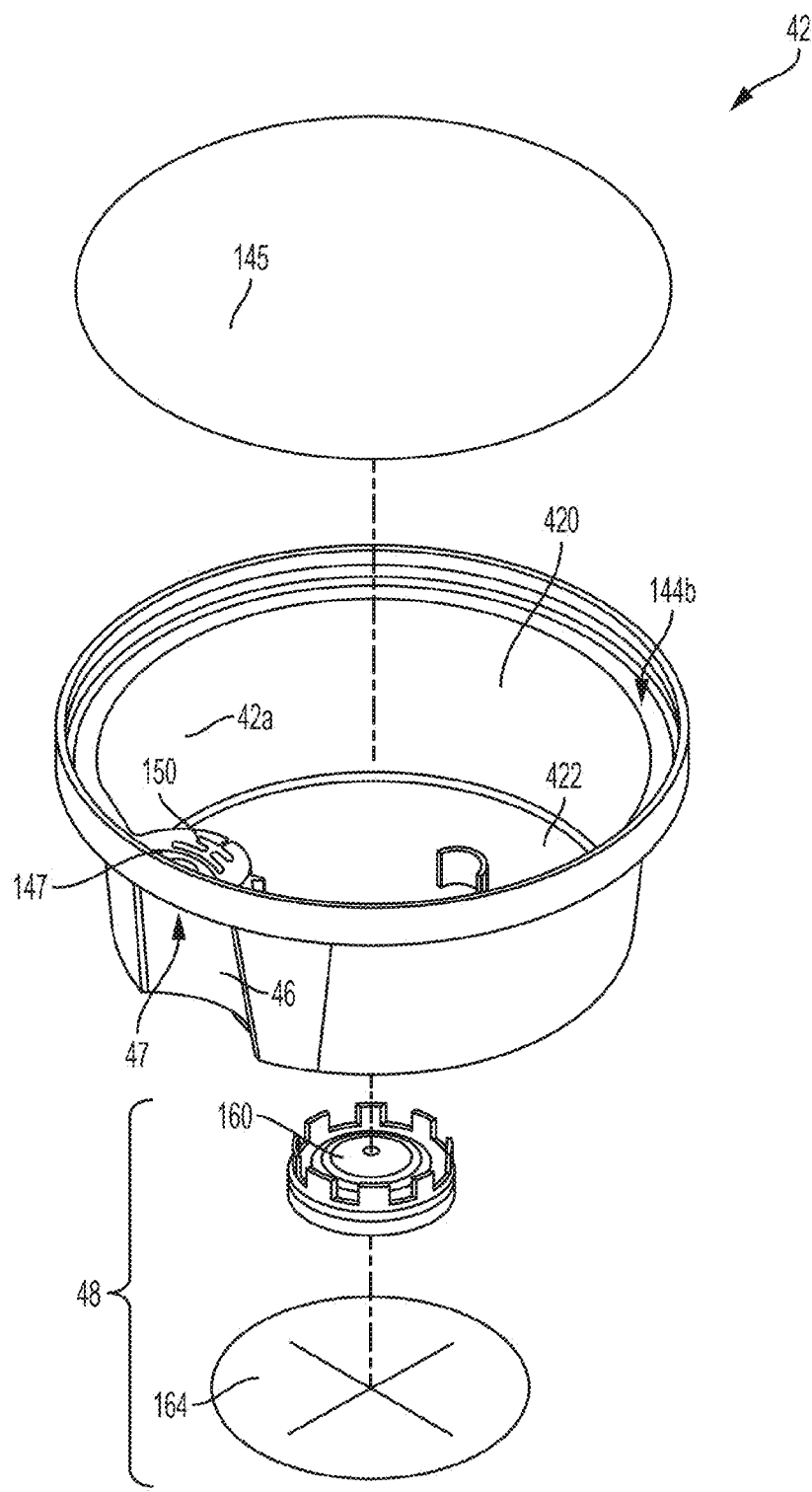
FIG. 5 shows an exploded view of the lower portion of the FIG. 1A cartridge.

The inlet may be strategically positioned on the cartridge to facilitate proper alignment between the inlet with a cooperating component of the beverage making system. As seen in FIGS. 2-3 and 5, in one illustrative embodiment, the lower portion 42 includes an inlet 47 located at an underside or lower surface of the rim 44. The inlet 47 may be located at an indexing groove 46 of the cartridge 4, e.g., with the indexing groove 46 located below the inlet 47 to ensure that the inlet 47 is appropriately positioned relative to a cartridge holder when placed in a beverage making machine.

Figure 6:
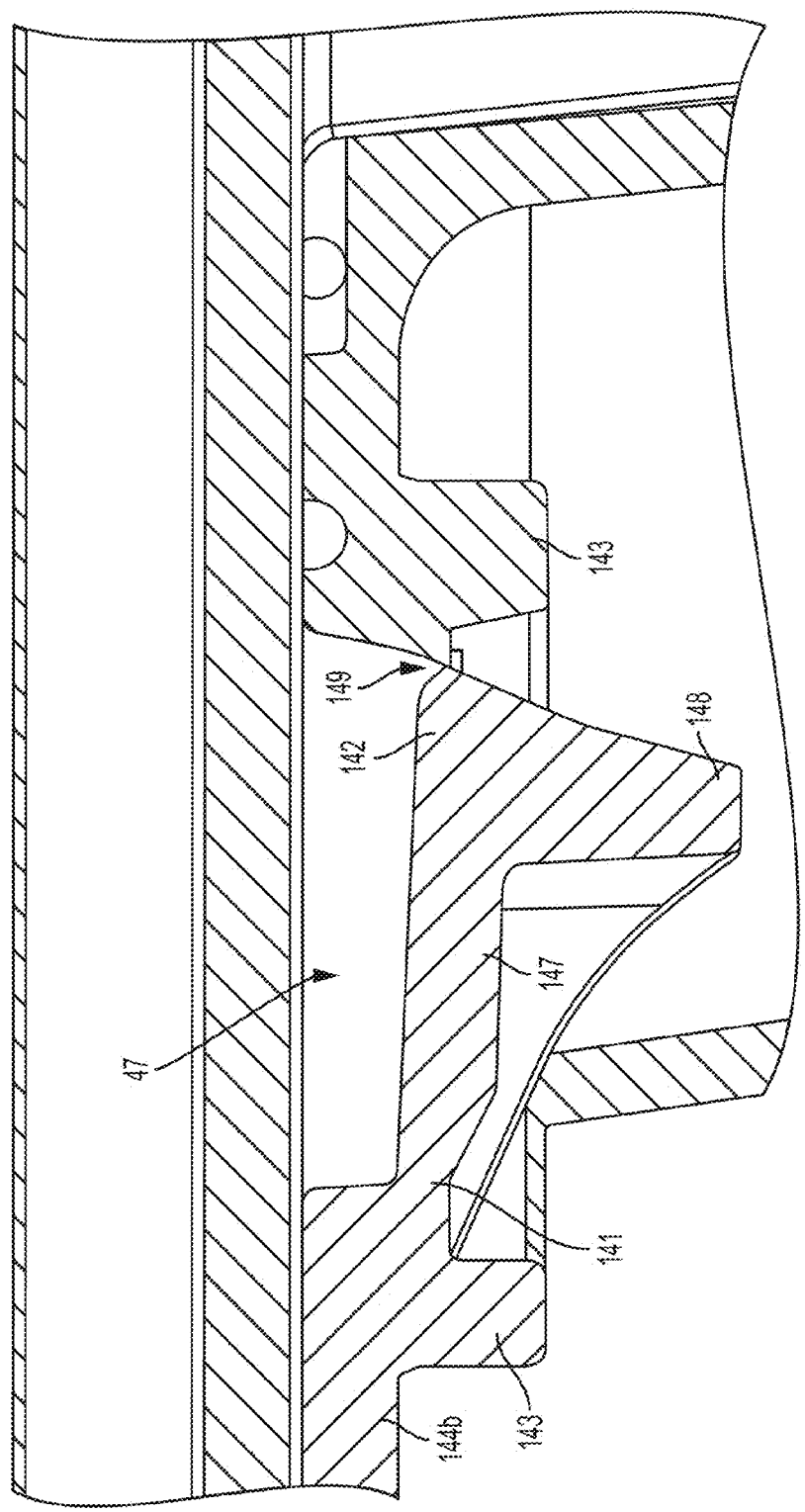
FIG. 6 shows a cross-sectional view depicting a gas inlet into the lower portion of the FIG. 1A cartridge.

To controllably resist and allow access to the lower internal space of the lower portion through the inlet, the inlet may include a flow control element such as a valve or a membrane seal. The flow control element may be opened to allow access through the inlet to the lower internal space of the lower portion, e.g., so pressurized gas or liquid can be introduced into the lower internal space to move a beverage medium out of the outlet of the lower portion. In some embodiments, the inlet may include a pierceable portion of the rim 44. In some embodiments, at least a portion of the inlet flow control element is detachable from a lower surface of the rim. An enlarged view of the inlet 47 is depicted in FIG. 6, which is a cross-sectional view of the cartridge taken through the inlet 47. As seen in FIG. 6, the inlet 47 includes an inlet valve 147 that is coupled to the rim 44 via a hinge 141 such that the inlet valve 147 is moveable relative to the rim 44. The inlet valve 147 is a flow control element that controls the entry of fluid through the inlet 47. Before the inlet valve 147 is opened, the valve end 142 is coupled to the rim 44 at a break region 149. In the embodiment shown in FIG. 6, the break region is a weakened region of thin material that can be torn open by an application of force to the valve 147. In some embodiments, the break region 149 may be scored or otherwise have a line or region of weakness that defines a preferential opening area. In some cases, the valve end 142, break region 149 and rim 44 are formed as one monolithic component, e.g., as a molded part. Detachment of the valve end 142 from the rim 44 at the break region 149 allows the inlet valve 147 to open. With the valve end 142 detached from the rim 44 at the break region 149, the inlet valve 147 is free to pivot relative to the rim 44 about the hinge 141. In the embodiment shown in FIG. 6, the hinge 141 is a living hinge—i.e., the hinge 141 is made from the same material and is continuous with the two pieces it connects (the rim 44 and the inlet valve 147) such that the rim 44, the hinge 141 and the inlet valve 147 are formed as one monolithic component.

Figure 7:
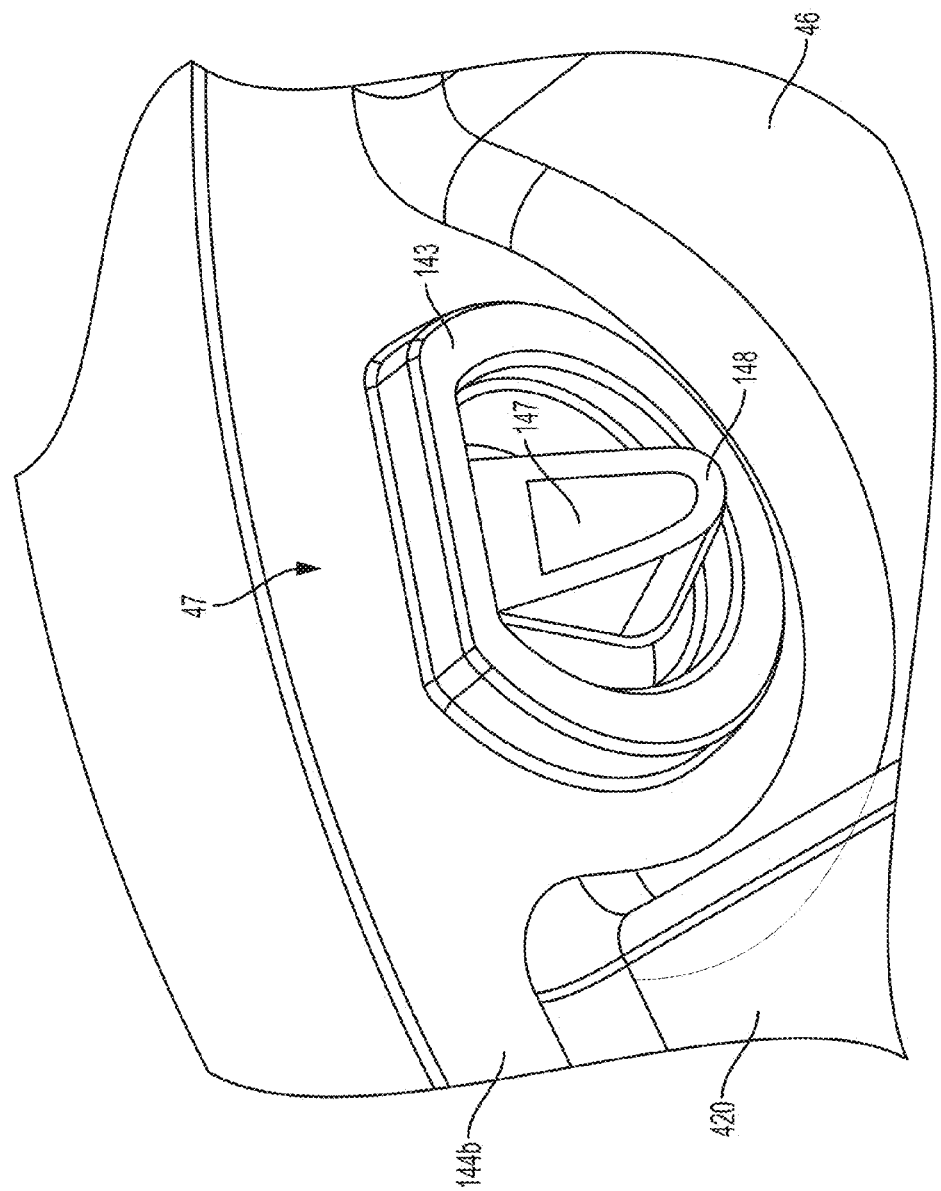
FIG. 7 shows a bottom perspective view of the gas inlet of FIG. 6.

Detachment of the valve end 142 from the rim 44 at the break region 149 may occur using any suitable arrangement. In some embodiments, as will be discussed in more detail below, an object may push up against the underside of the inlet valve 147 until the valve end 142 detaches at the break region 149. As seen in FIGS. 6 and 7, in some embodiments, the underside of the inlet valve 147 includes a downwardly-extending protrusion 148. In some cases, a component from a beverage making system may push up against the downwardly-extending protrusion 148 to open the inlet valve 147. In other embodiments, the underside of the inlet valve 147 may be subjected to a blast of air or other fluid that exerts a force on the underside of the inlet valve 147 until the valve end 142 detaches at the break region 149.

As seen in FIG. 7, which is a bottom perspective view of the inlet 47, the rim 44 may include a sealing surface 143 surrounding the inlet valve 147. In some embodiments, like that shown in FIG. 7, the sealing surface 143 is D-shaped. Other shapes for the sealing surface 143 are possible as well, for example, circular, oval or square. As seen in FIG. 6, the D-shaped sealing surface 143 is located at the lower surface or side of rim 44. The increased vertical thickness of the rim 44 at the D-shaped sealing surface 143 may help to define the weakened break region 149 where the valve 147 breaks free of the rim 44. The hinge 141 of the valve is located along the flat of the D-shape. The bottom surface of the downwardly-extending protrusion 148 is sloped upwardly toward the flat of the D-shape such that the protrusion 148 has the smallest vertical thickness at the flat of the D-shape and the greatest vertical thickness at the side opposite the flat of the D-shape. The shape of the protrusion 148 causes an opening force applied to the underside of the protrusion 148 (e.g., by a beverage making machine) to concentrate at the side of the D-shape opposite the flat. As a result, the opening of the valve 147 occurs first at the side of the D-shape opposite the flat and then progresses toward the flat side. In some cases, the sealing surface 143 may provide a seal surface for a beverage making system to engage with to prevent air leakage when pressurized air or other gas (or liquid) is introduced into the second portion 42.

In this embodiment, the inlet 47 includes a flow control element in the form of a hinged valve that can be detached from the lower portion at one end. However, it should be appreciated that other arrangements for a flow control element are possible, such as a self-closing septum valve, a one-way valve, a check valve, a pressure-opening valve or a membrane seal. In embodiments using a seal as a flow control element, the seal may be opened via piercing, bursting with pressure, peeling the seal off or back, or other suitable arrangement. In some cases, a semi-permeable membrane that permits passage of air but not liquids or solids may be used. In addition, in this embodiment, the valve is coupled to the lower portion by forming the valve as one monolithic component with the rim 44. However, it should be appreciated that the flow control element may be coupled to the portion in other ways, such as with an adhesive, a physical interlock, an interference fit, a fastener, a threaded engagement, or any other suitable arrangement.

The inventors have appreciated that, in some embodiments, the presence of beverage medium near or at the inlet valve 147 of the lower portion 42 may interfere with opening of the valve 147, and/or may cause beverage medium to leak out of the lower portion once the valve 147 has opened and come into contact with the beverage making system, which may contaminate the system and subsequent beverages and/or interfere with the operation of the beverage making system. As such, the inventors have recognized a need for an arrangement where the interior space holding the beverage medium is physically separated from the inlet into the interior space. Accordingly, one aspect of the invention relates to isolating or protecting the inlet of the beverage medium portion from contact with beverage medium while allowing for fluid communication between the inlet and the internal space of the portion where the beverage medium is held.

Figure 8:
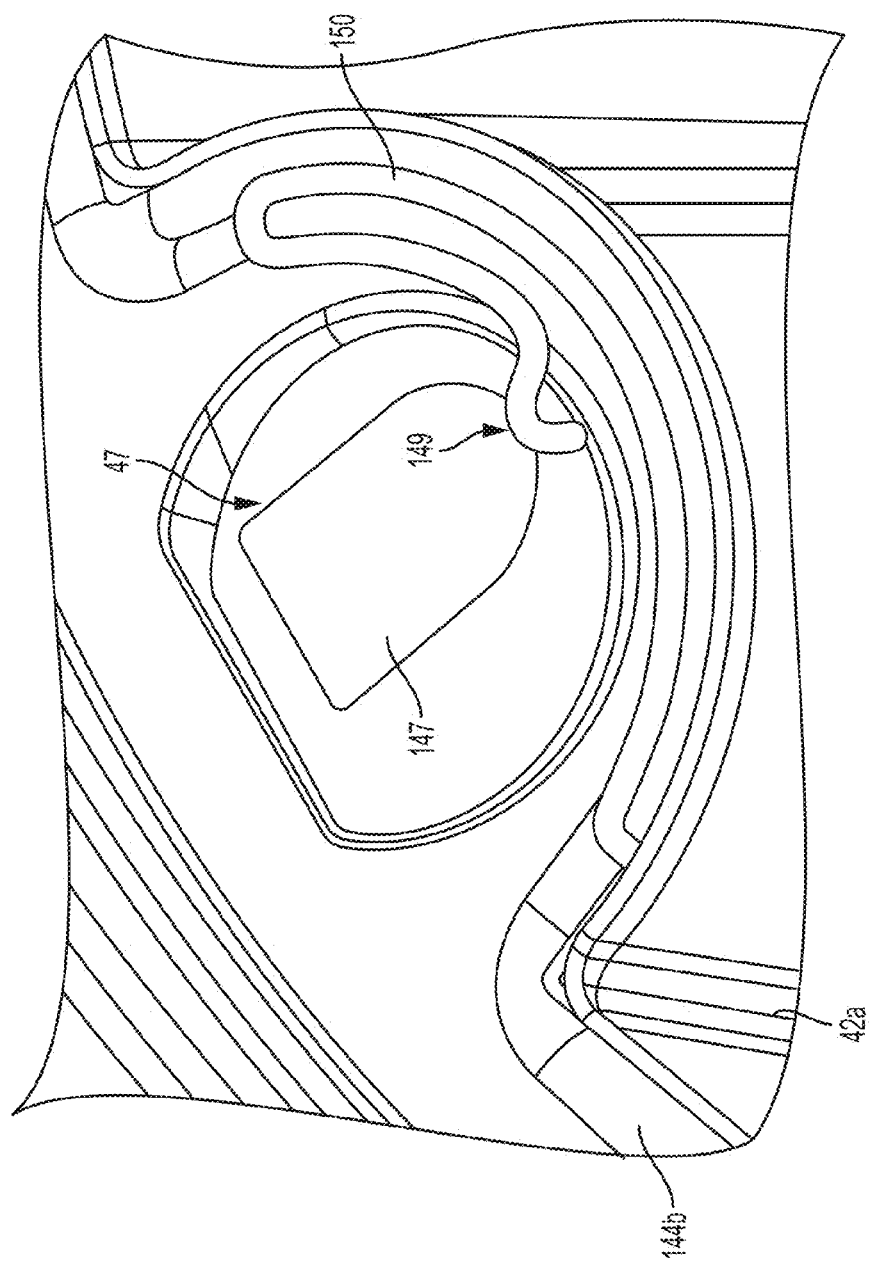
FIG. 8 shows a top perspective view of the gas inlet of FIGS. 6-7.

In accordance with one aspect of the invention, the cartridge includes a gas path that fluidly connects the inlet of the beverage medium portion with the internal space of the portion where the beverage medium is held. In one illustrative example, as seen in FIG. 8, which depicts the top side of the inlet 47, the lower surface 144b of the rim 44 includes a gas path 150 extending from the break region 149 of the inlet valve 147 and into the lower internal space 42a of the lower portion 42. The gas path 150 directs air entering through inlet 47 into the lower internal space 42a to exert a force upon the beverage medium contained within the lower internal space 42a. In this embodiment, the gas path 150 is an indented channel into the lower surface 144b of the rim, although other arrangements are possible, as discussed below. As seen in FIGS. 2-3 and 5, the lid 145 of the lower portion 42 overlies the inlet 47 and the gas path 150, thus serving to define the upper boundary of the gas path 150. In some embodiments, the lid may overlie at least a portion of the gas path and thus serve to define the upper boundary of at least a portion of the gas path. Movement of the inlet valve 147 toward an open position opens fluid communication through the inlet 47 into the gas path 150, e.g., by lifting the lid 145 in a local area between the valve 147 and the gas path 150. Air or gas that is directed through the inlet 47 may then travel through the gas path 150 and enter the lower internal space 42a. Inclusion of a gas path 150 separating the portion inlet 47 from the lower internal space 42a holding the beverage medium may help to separate the beverage medium from the portion inlet 47. In the embodiment shown in FIG. 8, the gas path 150 has a serpentine path. Having a suitably narrow, shallow and/or curved path may help resist movement of beverage medium, such as a beverage syrup, into the gas path 150 such that the beverage medium reaches the inlet 47.

It should be appreciated that the gas path need not be limited to the particular shape or arrangement shown in FIG. 8. For example, the gas path could be any shape, could have more or less undulations, or could be a straight gas path. The gas path may be a channel, indentation, groove, cut-out, hollowed-out section, or other suitable pre-defined path along which gas can travel. In some cases, liquids or solids may travel along the path as well. In some embodiments, the gas path may be defined using a glue or adhesive pattern between two surfaces of overlapping material such that non-adhered portions define a path through which gas can travel and adhered portions define the boundaries of the path. For example, instead of the gas path being an indentation into the lower surface 144b of the rim 44 as with the embodiment shown in FIG. 8, the gas path may be formed using a glue or adhesive pattern between the lid 145 of the lower portion 42 and the lower surface 144b of the rim 44. As one example, the lid 145 may be adhered to the lower portion 42 at certain areas to define boundaries of a gas path, while non-adhered areas define a path through which gas can travel. In some embodiments, the gas path may have a length of 10 to 30 mm, a width of 0.1 to 1 mm, and a depth of 0.1 to 0.5 mm. In one embodiment, the gas path has a length of approximately 22 mm, a width of between 0.45 and 0.7 mm and a depth of approximately 0.3 mm.

The lower portion of the cartridge can have an outlet arranged in different ways so that beverage medium in the cartridge can be released and mixed with a precursor liquid to form a beverage. The outlet may be arranged to prevent contents inside the lower internal space of the lower portion of the cartridge from exiting the lower portion until a desired point in a beverage-making process. In some embodiments, the outlet includes one or more flow control elements that serve to prevent contents inside the lower internal space of the lower portion of the cartridge from exiting the lower portion until a desired point in a beverage-making process.

In the embodiment shown in FIGS. 2 and 5, the lower portion 42 includes an outlet 48 which includes one or more flow control elements configured to resist and to enable fluid communication through the outlet. In one embodiment, an outlet valve 160 and an outlet covering 164 serve as flow control elements. The valve 160 and the outlet covering 164 may both serve to resist beverage medium 31 inside the lower internal space 42a from exiting the lower portion 42 until a desired point in a beverage-making process. In some embodiments, the outlet covering 164 may be scored or otherwise weakened along one or more lines/regions defining a preferential opening area. In one embodiment, the scored region is X-shaped. In other embodiments, the outlet covering has no weakened regions and is thus uniform in strength. As seen in FIG. 2, an annular groove 163 surrounds the outlet 48. The outlet covering 164 extends over both the outlet 48 and the annular groove 163. In embodiments where the outlet covering has a weakened region, the annular groove 163 surrounds the weakened region. The annular groove may protrude below the bottom wall 422 of the lower portion 42. As will be discussed below, an annular outlet piercer of a beverage making system may be inserted into the annular groove 163, causing the outlet covering 164 to tear open along the weakened lines/regions. In some embodiments, insertion of an annular outlet piercer of a beverage making system into the annular groove 163 may cause quadrants (or other suitably-divided portions) of the outlet covering 164 to peel back in a radially outward direction, exposing the outlet 48.

With the outlet covering 164 opened (or in embodiments where no outlet covering 164 is used), an increase in pressure inside the lower internal space 42a, e.g., due to influx of pressurized air or gas into the lower internal space through the inlet 47, causes the pressure inside the lower internal space 42a to exceed the pressure outside the lower internal space, creating a pressure differential across the valve 160. The valve 160 opens when a threshold pressure differential is reached. The valve 160 may be any suitable flow control element such as a septum valve, a check valve, a pressure-opening valve or any other suitable valve. In some embodiments, the valve is omitted altogether. In some embodiments, the outlet may include either the valve or the outlet covering rather than both. For example, in one embodiment, the outlet includes a cover over an opening at the bottom surface of the cartridge.

It should be appreciated that other arrangements are possible. For example, the outlet may include one or more flow control elements such as a burstable seal that opens with increased pressure in the lower internal space 42a, a membrane that is pierced with a solid rod or needle-like device rather than an annular piercer, or a peel-off seal that can be removed by a user or a beverage making system.

Figure 9:
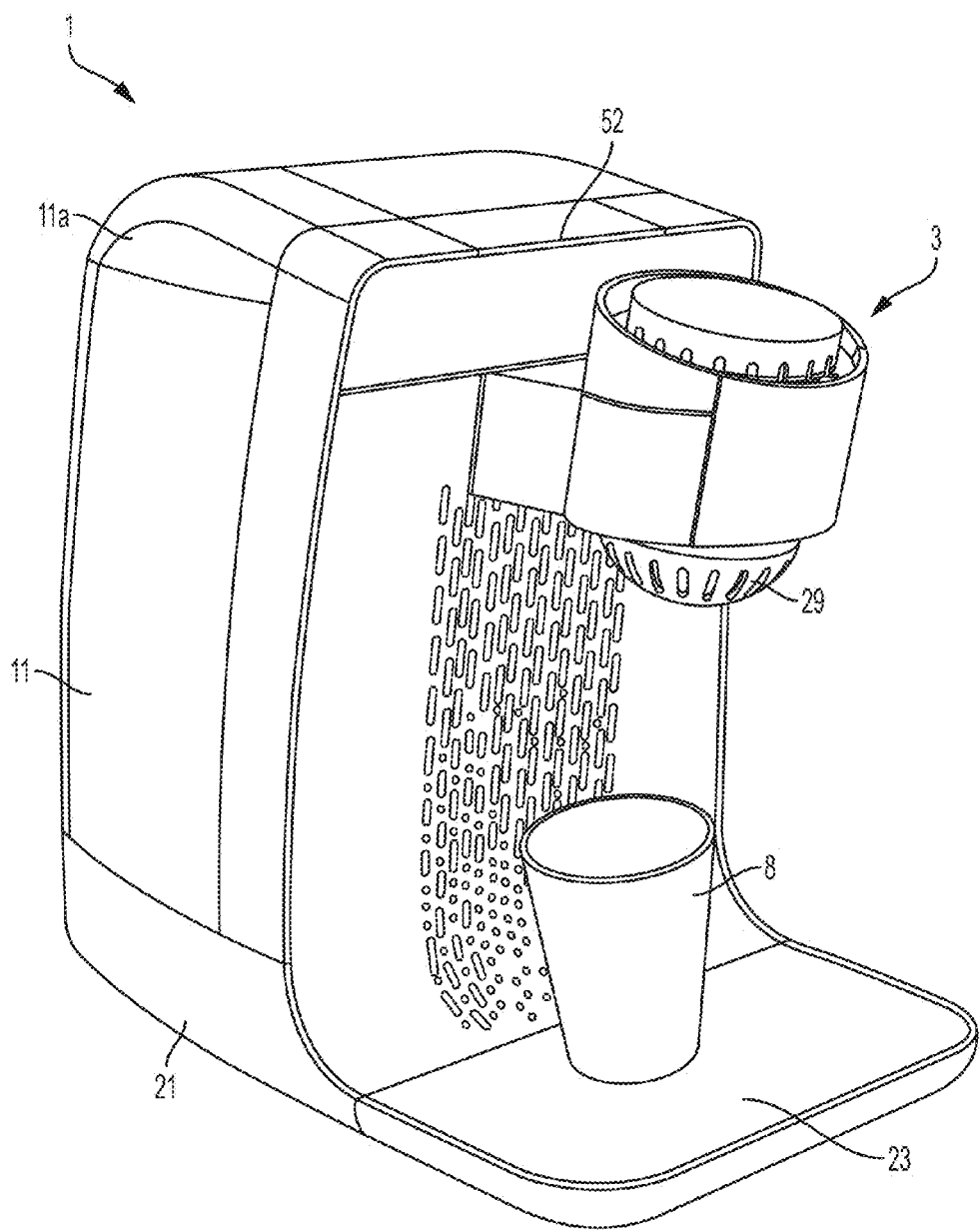
FIG. 9 shows a perspective view of an illustrative embodiment of a beverage making system.

Interaction of the cartridge with a beverage making system will now be discussed. While the cartridges may be used with different beverage making systems, FIGS. 9-14 show one beverage making system that may be used with a cartridge 4. FIG. 9 shows an illustrative embodiment of a beverage making system 1 that can be used with a cartridge. In this embodiment, components of the beverage making system 1 are located in or on a housing 21 which includes a drip tray 23 to support a user's cup or other container 8 and a reservoir 11. In this case, the reservoir 11 is optionally removable from the housing 21 and contains beverage precursor liquid 2, such as water, that is used to form a beverage dispensed at a dispensing station 29 into the user's container 8. The reservoir 11 includes a removable lid 11a that can be removed to provide precursor liquid 2 into the reservoir 11, but such a lid 11a is not required. Moreover, the reservoir 11 need not be removable and/or may be replaced by a plumbed connection to a mains water source. The beverage precursor liquid 2 can be any suitable liquid, including water (e.g., flavored or otherwise treated water, such as sweetened, filtered, deionized, softened, carbonated, etc.), or any other suitable liquid used to form a beverage, such as milk, juice, coffee, tea, etc. (whether heated or cooled relative to room temperature or not). The reservoir 11 is part of a beverage precursor supply which provides the precursor liquid 2 for conditioning of some kind, e.g., carbonation, filtering, chilling, mixing with a beverage medium, etc., and subsequent dispensing as a beverage.

Figure 10:
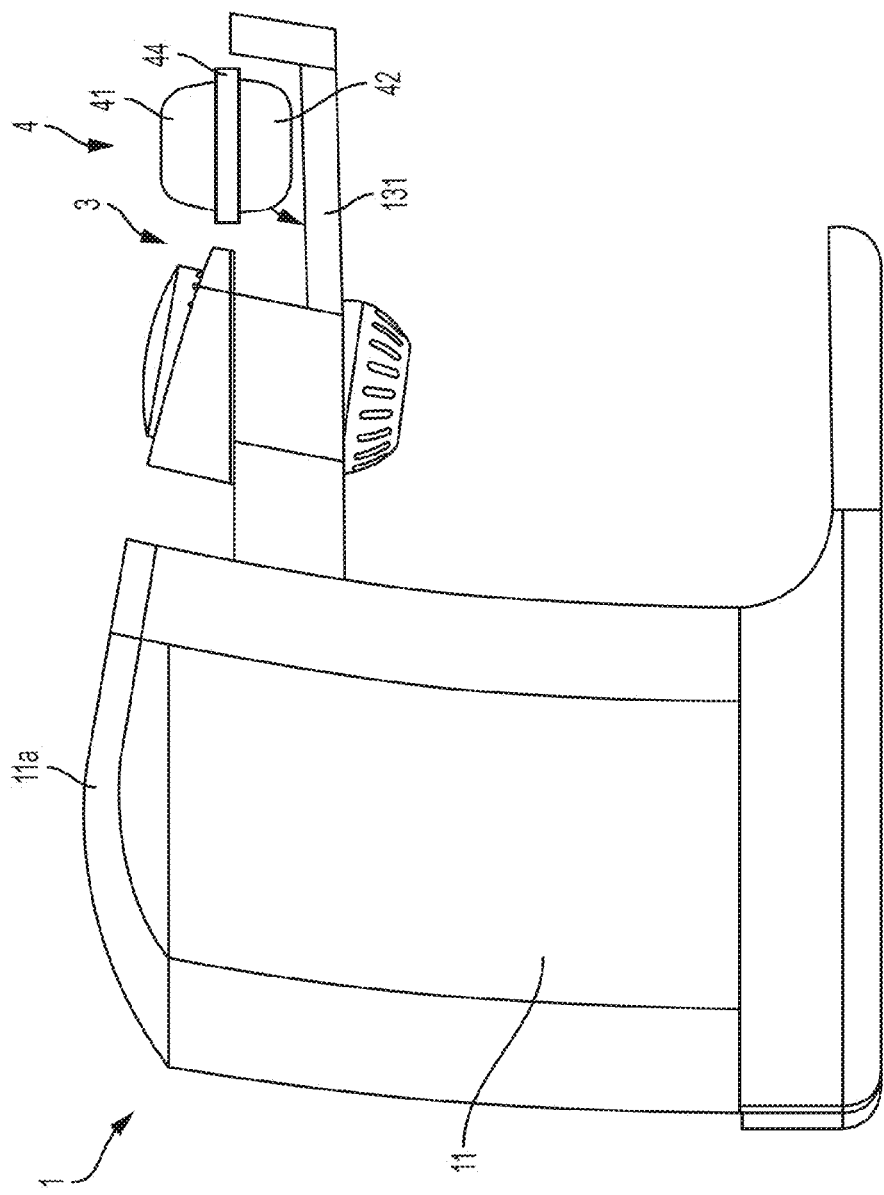
FIG. 10 shows a left side view of the beverage making system of FIG. 9 and a cartridge located in a cartridge holder of the beverage making system.

As can be seen in FIG. 10, a cartridge 4 containing a gas source and/or a beverage medium may be associated with a cartridge holder 3 of the system 1. As discussed previously, the gas source may emit carbon dioxide or other gas which is used by the system 1 to carbonate the precursor liquid, and a beverage medium, such as a flavoring agent, may be mixed with precursor liquid. In this embodiment, the cartridge 4 may be associated with the cartridge holder 3 by pulling a sliding drawer 131 forwardly to expose a cartridge receiver or receiving area of the drawer 131. The cartridge 4, which in this case includes an upper portion 41 containing a gas source and a lower portion 42 containing a beverage medium, may be placed in the cartridge receiving area of the drawer 131 and the drawer 131 closed by sliding to the left in FIG. 10. Thereafter, a user may interact with an interface, such as a touch screen, button or other device by which the user can cause the system 1 to make a beverage. In response, the cartridge holder 3 may clamp the cartridge 4 at the rim 44 located between the upper and lower portions 41, 42 by the cartridge holder 3, and the beverage making system may access upper and lower internal spaces 41a, 42a (see FIG. 2) to form the beverage. As is discussed in more detail below, in some embodiments, the cartridge holder is able to hold the upper and lower portions 41, 42 of the cartridge 4 in spaces having different pressures (e.g., the upper portion 41 may be held in a more highly pressurized space to receive carbonating gas than the lower portion 42) and/or able to pierce an inlet of the lower portion 42 at an underside of the rim 44 to access the beverage medium (e.g., by injecting pressurized air or other gas into the lower internal space 42a, thereby forcing the beverage medium to exit the cartridge and be dispensed at the dispensing station 29). Since the cartridge 4 may be replaceable, a user may exchange the cartridge 4 to make different beverages, such as carbonated water only, a carbonated and flavored beverage, a still and flavored beverage, etc.

Figure 11:
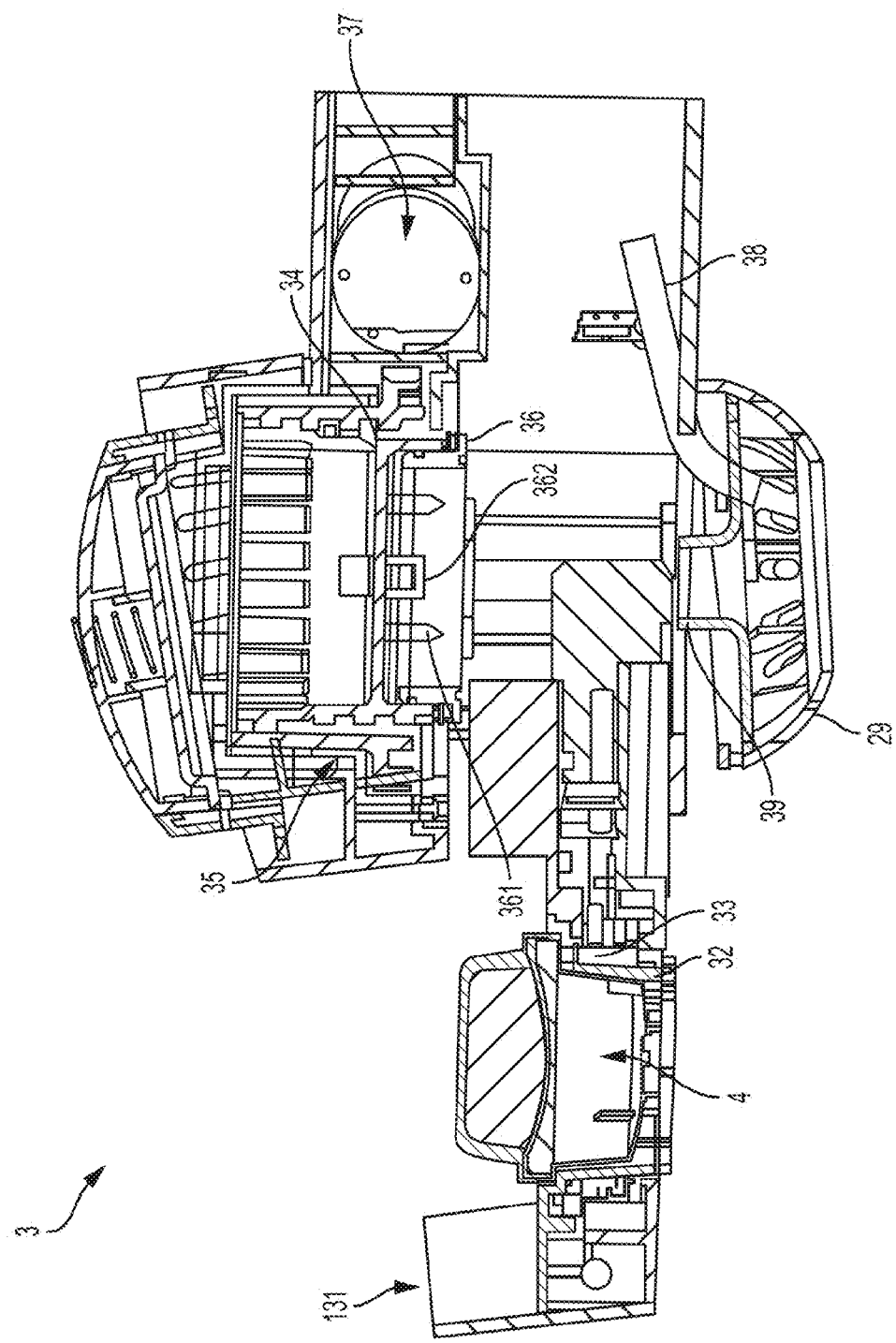
FIG. 11 shows a cross-sectional view of a cartridge holder useable with the beverage making system of FIG. 9 with a cartridge receiver in an open position.
Figure 12:
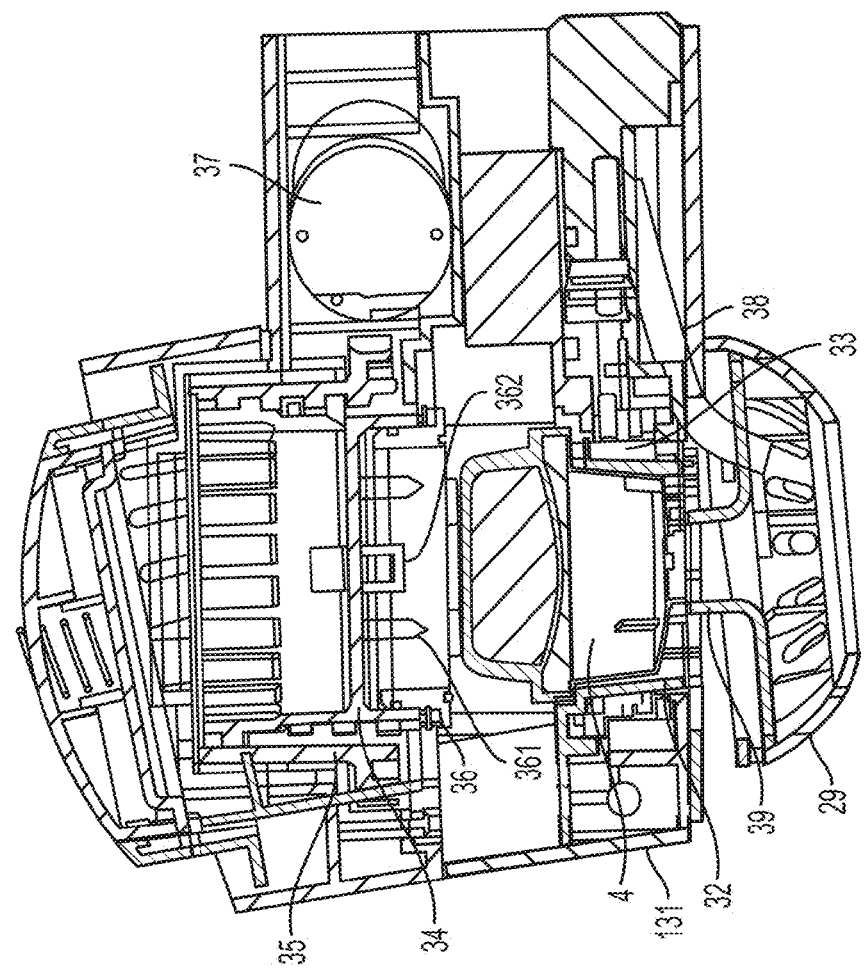
FIG. 12 shows a cross-sectional view of the FIG. 10 cartridge holder with the cartridge receiver in a closed position.

In accordance with an aspect of the invention, a cartridge may be held by a cartridge holder of a beverage making machine such that an upper portion of the cartridge is held in a space and has a pressure that is different from a space where a lower portion of the cartridge is held. For example, the upper portion may be held in a sealed space arranged to receive relatively high pressure gas used to carbonate the precursor liquid, while the lower portion is held at ambient pressure. Such an arrangement may help isolate the lower portion from relatively high pressures, e.g., preventing premature dispensing of beverage medium by introduction of high pressure gas into the lower portion 42. FIGS. 11 and 12 show a cross sectional side view of a cartridge holder 3 that may be included with the system 1 shown in FIGS. 9-10 and which may operate with a cartridge like that shown in FIGS. 1-3. In this embodiment, a lower portion of the cartridge holder includes a sliding drawer 131 shown in an open position with a cartridge 4 positioned in a basket 32, i.e., a cartridge receiver. The cartridge may be received in the basket 32 so that the rim 44 or other clamping structure rests on an upper ledge or surface of the basket 32 so the basket 32 supports the weight of the cartridge 4. With the cartridge 4 in the basket 32, the drawer 131 may be moved to a closed position shown in FIG. 12. Thereafter, an upper portion of the cartridge holder 3 may move downwardly to clamp the cartridge 4 in place, e.g., to house the upper portion 41 in a sealed space. In this embodiment, the upper portion of the cartridge holder includes a threaded sleeve 34 that carries a piston 36 and can move downwardly relative to the cartridge 4 so that a lower surface of the piston 36 contacts the cartridge rim 44 and clamps downwardly on the rim 44 to form a seal between the piston 36 and the rim 44. The threaded sleeve 34 and piston 36 move downwardly by rotation of a rotatable sleeve 35 positioned around a part of the threaded sleeve 34. Specifically, a worm gear of a motor drive 37 may engage a gear of the rotatable sleeve 35 so that the motor drive 37 can rotate the rotatable sleeve 35 relative to the threaded sleeve 34. Since the rotatable sleeve 35 and the threaded sleeve 34 are engaged by a thread connection, rotation of the rotatable sleeve 35 causes the threaded sleeve 34 to move downwardly (or upwardly, depending on the direction of rotation of the rotatable sleeve 35) relative to the cartridge 4.

Figure 13:
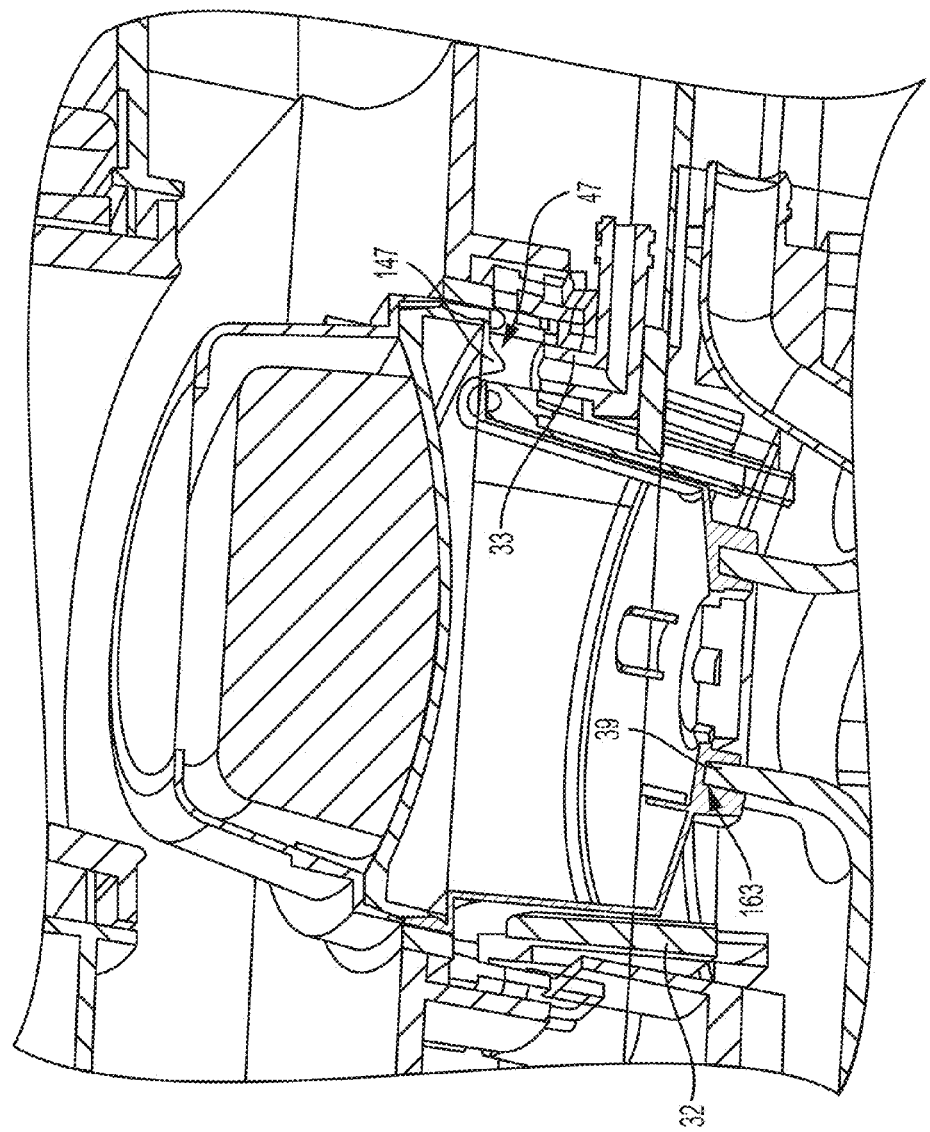
FIG. 13 shows a cartridge in a cartridge receiver and a gas inlet of a cartridge interacting with a beverage making system.

As the threaded sleeve 34 and the piston 36 move downwardly, the upper portion 41 of the cartridge 4 may be received into the threaded sleeve 34/piston 36 until the piston 36 contacts the cartridge rim 44 and urges the cartridge 4 to move downwardly against the lower portion of the cartridge holder. This downward movement can cause two actions, i.e., piercing of the inlet 47 and the outlet 48 of the lower portion 42. That is, the basket 32 may be movable in a vertical direction relative to the drawer 131, yet be spring biased to move upwardly and remain in an upper position even with the cartridge 4 in the basket 32. However, the clamping force of the upper portion of the cartridge holder (e.g., the threaded sleeve 34 and piston 36) can overcome the spring bias on the basket 32, causing the basket 32 and the cartridge 4 to move downwardly relative to the drawer 131. As seen in FIG. 13, downward movement of the basket 32 and cartridge 4 may cause a dispense gas element 33 to contact the underside of the inlet valve 147 and open the inlet valve 147 so that the dispense gas element 33 can deliver pressurized gas into the lower internal space 42a.

A gasket or other seal at the dispense gas element 33 can engage the cartridge 4 at the inlet 47 to form a leak-resistant connection at the inlet 47. As discussed above, the cartridge 4 may have a D-shaped sealing surface 143 (see FIG. 7) surrounding the inlet valve 147 to provide a seal surface for the beverage making system to engage with to prevent gas leakage. As will also be understood, the dispense gas element 33 may be connected to a line that provides pressurized gas, e.g., from an air pump. In accordance with an aspect of the invention, the cartridge may be opened at an underside of the rim 44 or other clamping structure to provide an opening through which pressurized gas can be introduced to move beverage medium out of the lower portion 42. Since the rim 44 or other clamping structure element may be made relatively robustly to establish a desired seal with the cartridge holder and to oppose an abutting force of the dispense gas element 33, a remainder of the cartridge 4 may be made out of relatively weak or less robust material or construction, e.g., to reduce cost and/or weight of the cartridge. Thus, the cartridge may be arranged to allow for reliable piercing for introduction of pressurized gas into the lower portion 42 and sealing with the cartridge holder at the rim 44, yet still decrease materials requirements.

In another embodiment, the dispense gas element 33 may open the inlet valve 147 simply by applying pressurized gas to the underside of the valve without needing to physically contact the valve. The valve opens due to a pressure differential across the valve created by application of pressurized gas to the valve underside.

Downward movement of the cartridge 4 and basket 32 may also cause an outlet piercing element 39 to contact the outlet covering or other cartridge portion at the outlet 48 so that the outlet 48 is opened. In this embodiment, the outlet piercing element 39 includes an annular rim that contacts the outlet covering and is received into an annular groove of the cartridge 4 above the outlet covering. As discussed above, movement of the outlet piercing element 39 into the annular groove 163 stresses the outlet covering 164 such that the membrane, which may be scored or otherwise have a line of weakness that defines a preferential opening area, tears open along the scored line/line of weakness and becomes pulled back so the outlet 48 can dispense beverage medium to the dispense station 29. A dispense line 38 for precursor liquid may also lead to the dispense station 29 so the precursor liquid 2 and beverage medium can be dispensed together, or separately, into a user's cup 8.

In accordance with an aspect of the invention, a cartridge may be held by a cartridge holder of a beverage making machine such that an upper portion of the cartridge is held in a space and has a pressure that is different from a space where a lower portion of the cartridge is held. For example, the upper portion may be held in a sealed space arranged to receive relatively high pressure gas used to carbonate the precursor liquid, while the lower portion is held at ambient pressure. Such an arrangement may help isolate the lower portion from relatively high pressures, e.g., preventing premature dispensing of beverage medium by introduction of high pressure gas into the lower portion 42.

Figure 14:
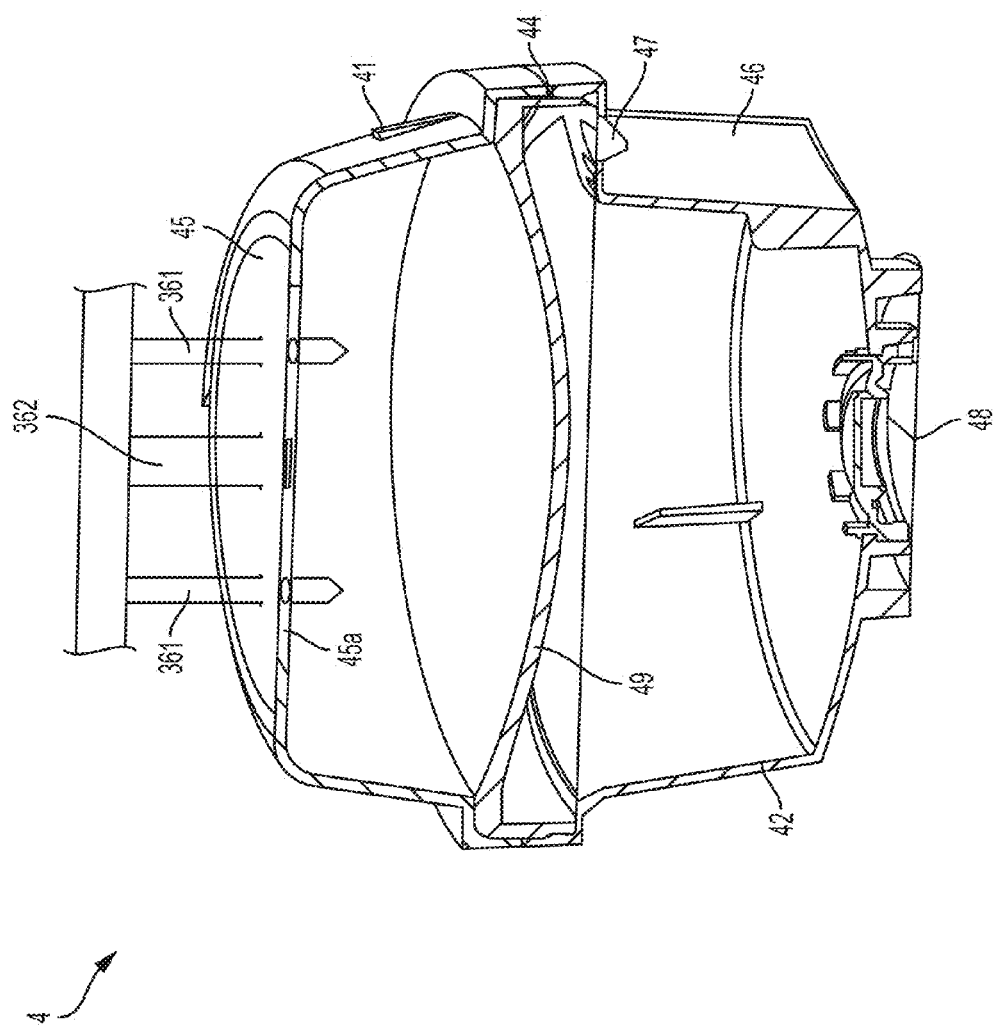
FIG. 14 shows a cartridge with an outlet piercing element piercing through a top lid of the cartridge and inlet piercing elements piercing through the top lid and a filter of the cartridge.

In accordance with an aspect of the invention, a cartridge may be arranged and held by a cartridge holder of a beverage making machine such that downward movement of the upper portion of the cartridge holder may also cause piercing of the cartridge lid or other action such that the upper internal space can be accessed. In this illustrative embodiment, the piston 36 includes a pair of piercing elements 361 arranged to pierce the lid 45 to introduce activating fluid into the upper portion 41, and a piercing element 362 arranged to pierce the lid 45 to allow gas emitted by the gas source to exit the cartridge 4. As seen in FIG. 14, the piercing elements 361 are arranged to penetrate through the lid 45 and the filter 45a so that activating fluid can be introduced below the filter 45a. However, the piercing element 362 is arranged to pierce only the lid 45, but not the filter 45a. In this way, gas emitted in the upper portion 41 must pass through the filter 45a before exiting to the beverage making system. This may help prevent gas source material, such as zeolite particles, from exiting the cartridge 4 and passing to a carbonating gas supply of the beverage making system. A variety of arrangements are possible for the filter 45a, such as a piece of filter paper mentioned above, a hydrophobic non-woven material that permits gas to pass, but resists liquid passage, or other element that permits gas to exit the cartridge 4, but resists movement of gas source material and/or liquid. In addition or alternately to the filter 45a, a conduit that receives the carbonating gas may include a filter element, such as a filter plug in the conduit, to help further resist movement of gas source materials to a carbonation tank of the beverage making system. The piercing elements may include a hollow needle, spike, blade, knife or other arrangement, to form a suitable opening in the cartridge 4. In this embodiment, the piercing elements 361 include tubular elements with an activating fluid discharge opening at a distal end such that activating fluid can be released from the piercing elements 361 below the filter 45a. In contrast, the piercing element 362 is relatively dull so as to penetrate the lid 45, but not the filter 45a. Alternately, the cartridge 4 may have defined openings, e.g., one or more ports that include a septum or other valve-type element that permits flow into and/or out of the cartridge 4.

It should be understood that a cartridge holder 3 is not necessarily limited to the embodiments described herein. For example, the cartridge holder may open and close in any suitable way to allow cartridges 4 to be placed in and/or removed from the holder 3. In one embodiment, a cartridge holder may include a lid pivotally mounted to a receiver portion of the holder 3, and may be opened and closed manually, such as by a handle and linkage arrangement, or automatically, such as by a motor drive, to close the cartridge holder 3. Of course, the lid may be arranged in other ways, such as being engaged with the cartridge receiver by a threaded connection (like a screw cap), by the cartridge receiver moving relative to the lid while the lid remains stationary, by both the lid and receiver portion moving, and so on. In addition, a cartridge holder 3 need not necessarily have a lid and receiver arrangement, but instead may have any suitable member or members that cooperate to open/close and support a cartridge. For example, a pair of clamshell members may be movable relative to each other to allow receipt of a cartridge and physical support of the cartridge. Some other illustrative cartridge holder arrangements are shown, for example, in U.S. Pat. Nos. 6,142,063; 6,606,938; 6,644,173; and 7,165,488. As mentioned above, the cartridge holder 3 may allow a user to place one or more cartridges in the holder 3 without the need for the user to take special steps to establish a pressure-tight, leak-proof or other specialized connection between the cartridge and other portions of the system 1. Instead, in some embodiments, the user may be able to simply place the cartridge in a receiving space, and close the cartridge holder.

Figure 15:
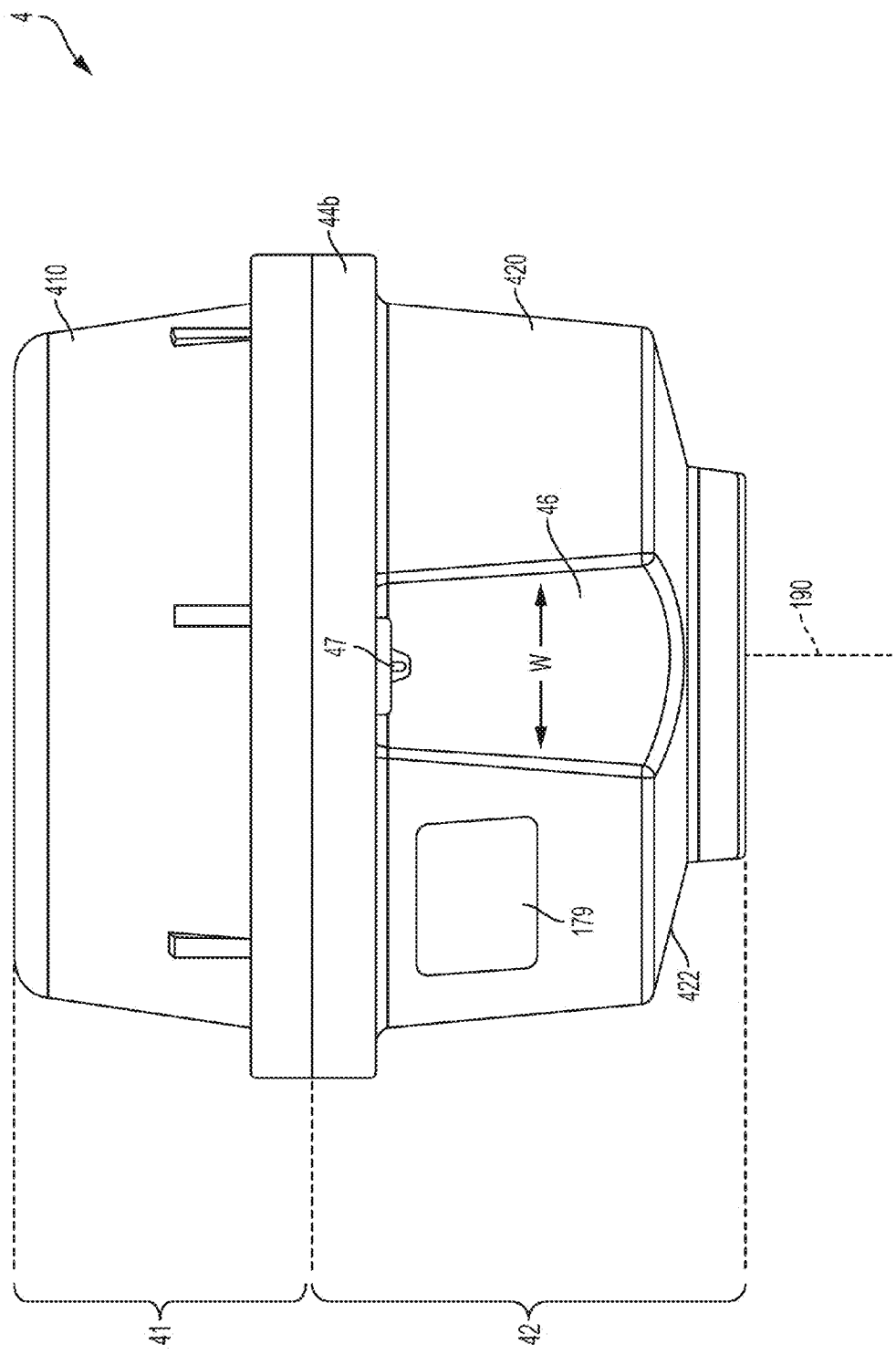
FIG. 15 shows a front view of a cartridge having an indexing feature.
Figure 16:
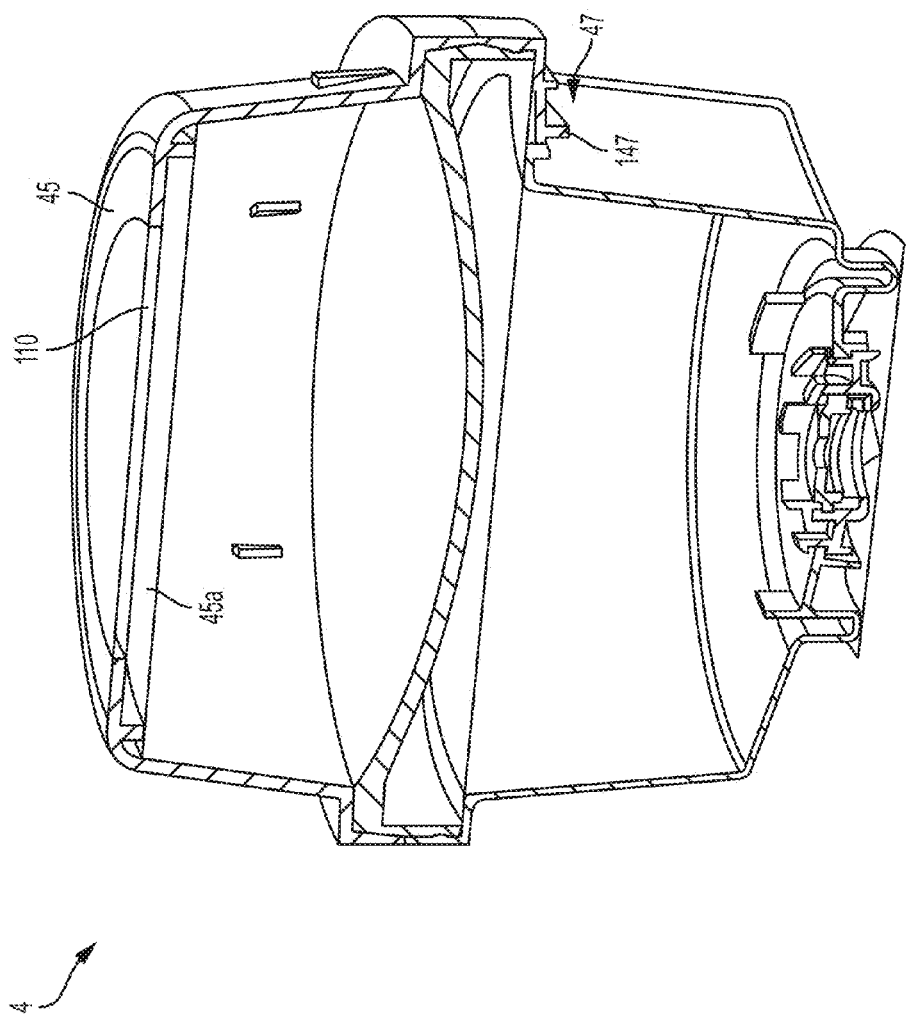
FIG. 16 shows a cross-sectional view of a modified version of the FIG. 1A cartridge.

According to one aspect, the cartridge includes an indexing feature to facilitate positioning of the cartridge in a properly aligned orientation when inserted into a cartridge holder of a beverage making system. The indexing feature may be formed into the sidewall 420 of the lower portion 42. As seen in FIG. 15, the cartridge 4 includes an indexing feature 46 in the form of a groove, recess or indentation into the sidewall 420 of the lower portion 42. The indexing feature 46 extends from the bottom wall 422 of the lower portion 42 up to the rim 44. The indexing feature 46 is laterally curved into the sidewall 420 of the lower portion 42 about an axis that may be parallel to the vertical axis 190 of the lower portion 42. In some embodiments, the indexing feature 46 is curved about an axis that is slanted relative to the vertical axis 190 of the lower portion 42. In some embodiments, the indexing feature 46 is curved about an axis that is slanted outwardly away from the vertical axis 190 of the lower portion 42 as the indexing feature axis extends from the bottom wall 422 towards the top of the lower portion 42. In other embodiments, the indexing feature is curved about an axis that is parallel from the vertical axis 190. The width W of the indexing feature 46 may taper as the indexing feature 46 extends from the bottom wall 422 towards the top of the lower portion 42. Alternatively, the width W of the indexing feature may taper from the top of the lower portion 42 towards the bottom wall 422, or may remain constant.

The indexing feature 46 may be aligned with and/or adjacent the inlet 47 of the lower portion 42. In some embodiments, the indexing feature 46 is located below the inlet 47. In one illustrative embodiment, best seen in FIGS. 2 and 7, where the indexing feature 46 is a recess into the sidewall 420, the rim 44 has a greater overhang distance at the indexing feature 46 than at the other angular positions of the rim 44. Overhang distance is measured in the radially outward direction from the sidewall 420 to the end of the rim 44. As best seen in FIG. 7, the rim 44 has an enlarged underside area at the indexing feature 46 than at the other angular positions of the rim 44. In some embodiments, an enlarged underside area may allow one or more features to be added to the enlarged underside area, such as an inlet. In the illustrative embodiment shown in FIG. 7, the inlet 47 is located at the portion of the rim 44 underside that is enlarged due to the indexing feature 46. However, it should be appreciated that the indexing feature may be located anywhere on the cartridge 4 and need not be aligned with and/or adjacent the inlet 47.

It should be appreciated that the indexing feature is not limited to the specific groove shape shown in FIG. 15. For example, the indexing feature may be a protrusion, an indentation or recess in the top of bottom of the cartridge, or any other suitable geometry. In some cases, the indexing feature may be incorporated into clamping structure of the cartridge, e.g., one or more gaps between protrusions may be exploited to ensure proper positioning of the cartridge.

Figure 17:
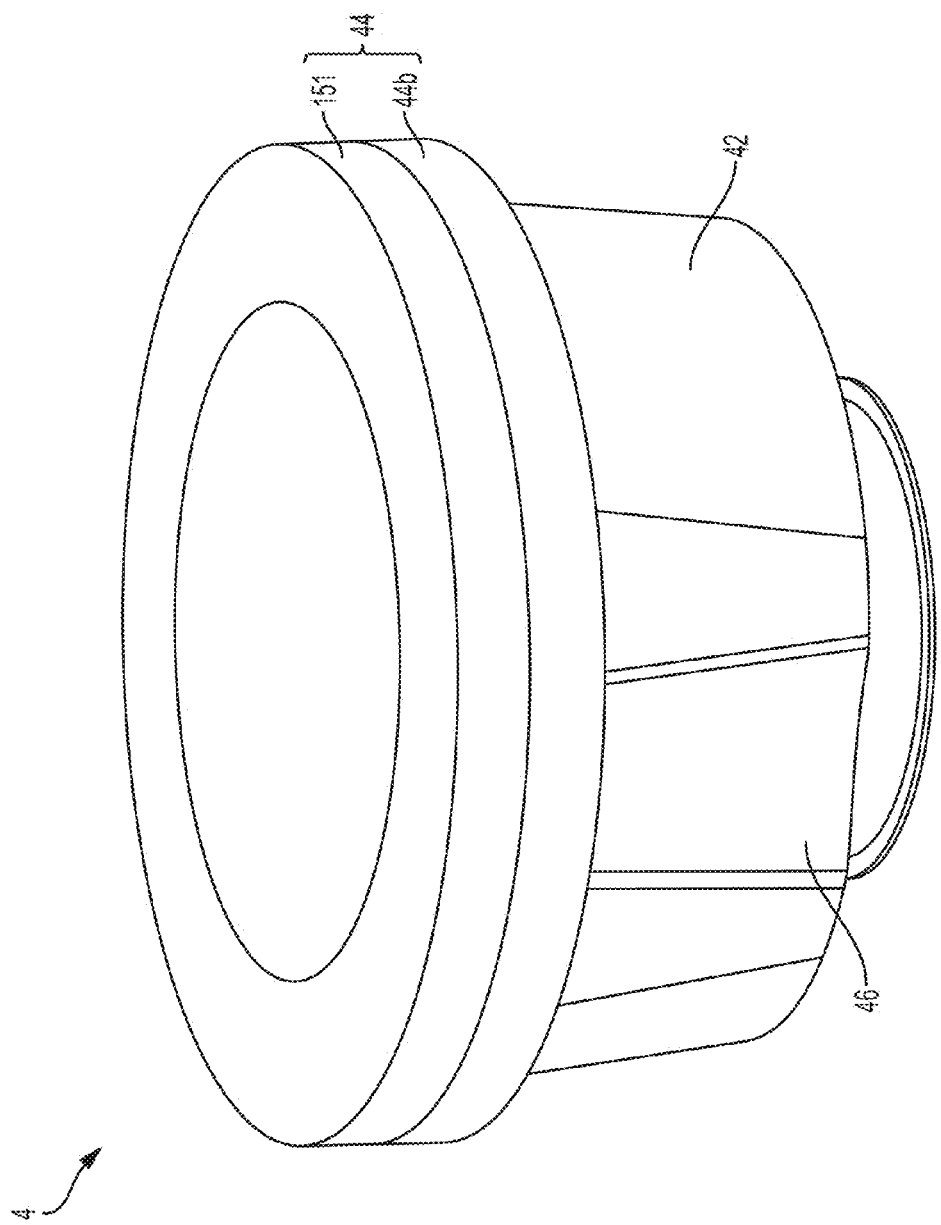
FIG. 17 shows a perspective view of another modified version of the FIG. 1A cartridge.
Figure 18:
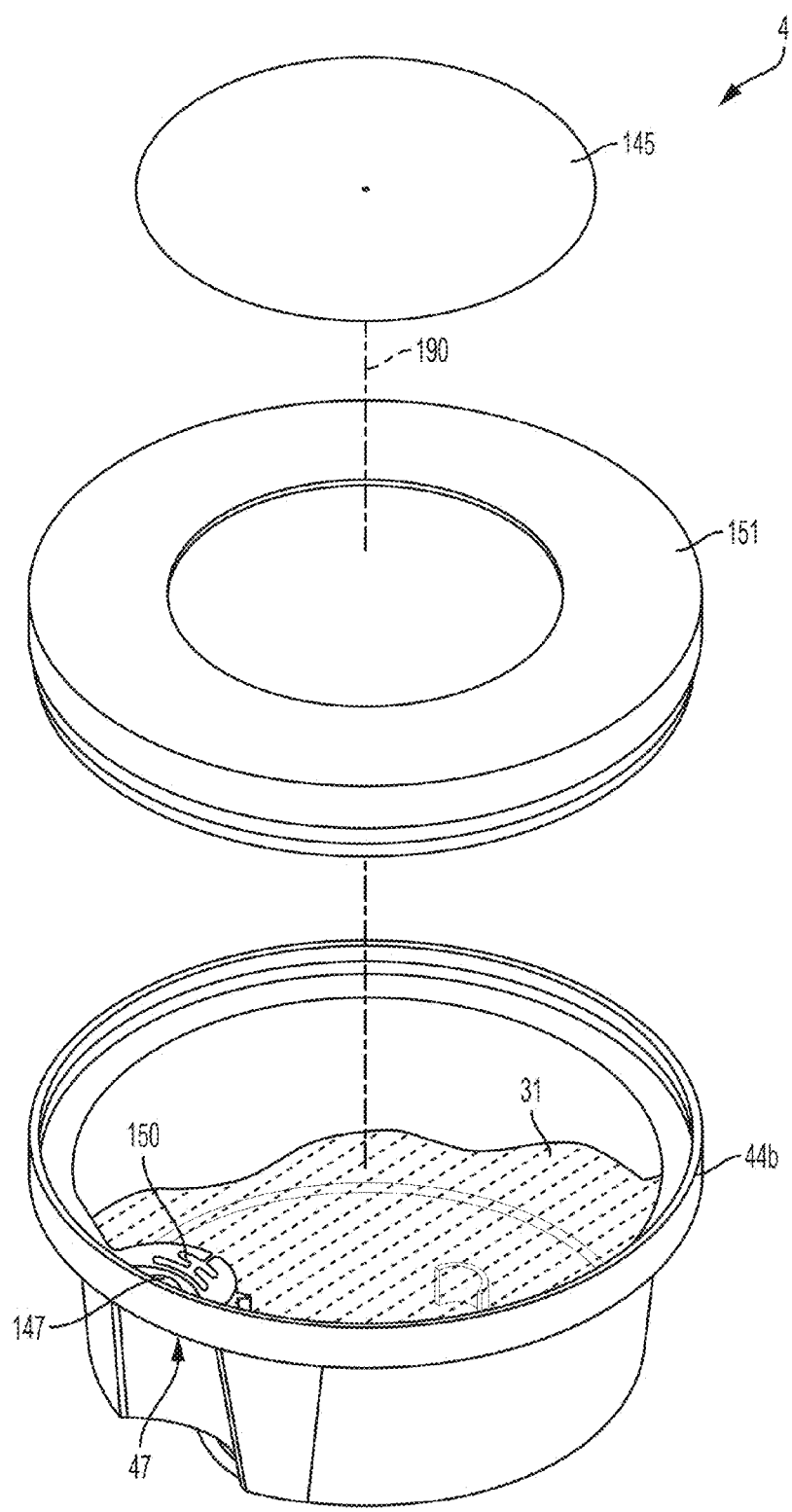
FIG. 18 shows an exploded view of the cartridge of FIG. 17.

In some embodiments, the cartridge may be modified to provide only beverage medium to make a still, flavored beverage, or only a gas source to make a carbonated water. Optionally, the cartridge may be configured to work with the beverage making system described above. For example, as shown in FIGS. 17-18, cartridge 4 is modified to have only a single portion 42 containing a beverage medium 31. The portion 42 attaches to a cap 151. The rim 44 of the lower portion 42 combines with the cap 151 to form a rim 44. As with the lower portion 42 in the embodiment shown in FIGS. 1-8, the portion 42 in the embodiment shown in FIGS. 17-18 includes an inlet 47 having an inlet valve 147 and a gas path 150. Where the cartridge does not include a gas source, there may be no need to maintain any part of the cartridge in a sealed space. Thus, the rim or other clamping structure need not be arranged to provide a sealing surface for engaging with a cartridge holder, but instead may function to allow the cartridge holder to hold the cartridge in a desired position, e.g., to press downwardly on the cartridge to pierce a gas inlet and/or beverage medium outlet of the cartridge. In such a case, simple radially extending tabs or ribs may provide suitable clamping structure, though other arrangements are possible.

Figure 19:
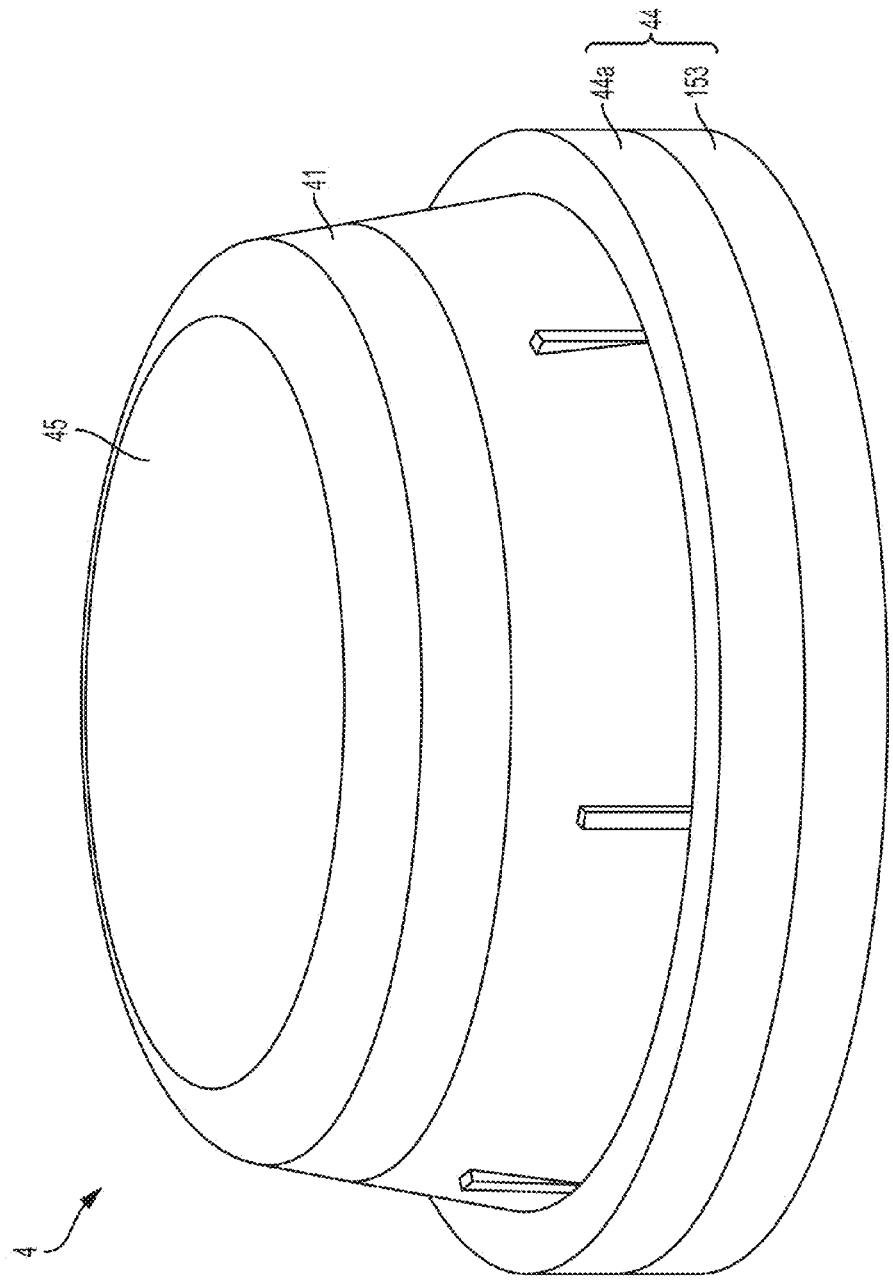
FIG. 19 shows a perspective view of another modified version of the FIG. 1A cartridge.
Figure 20:
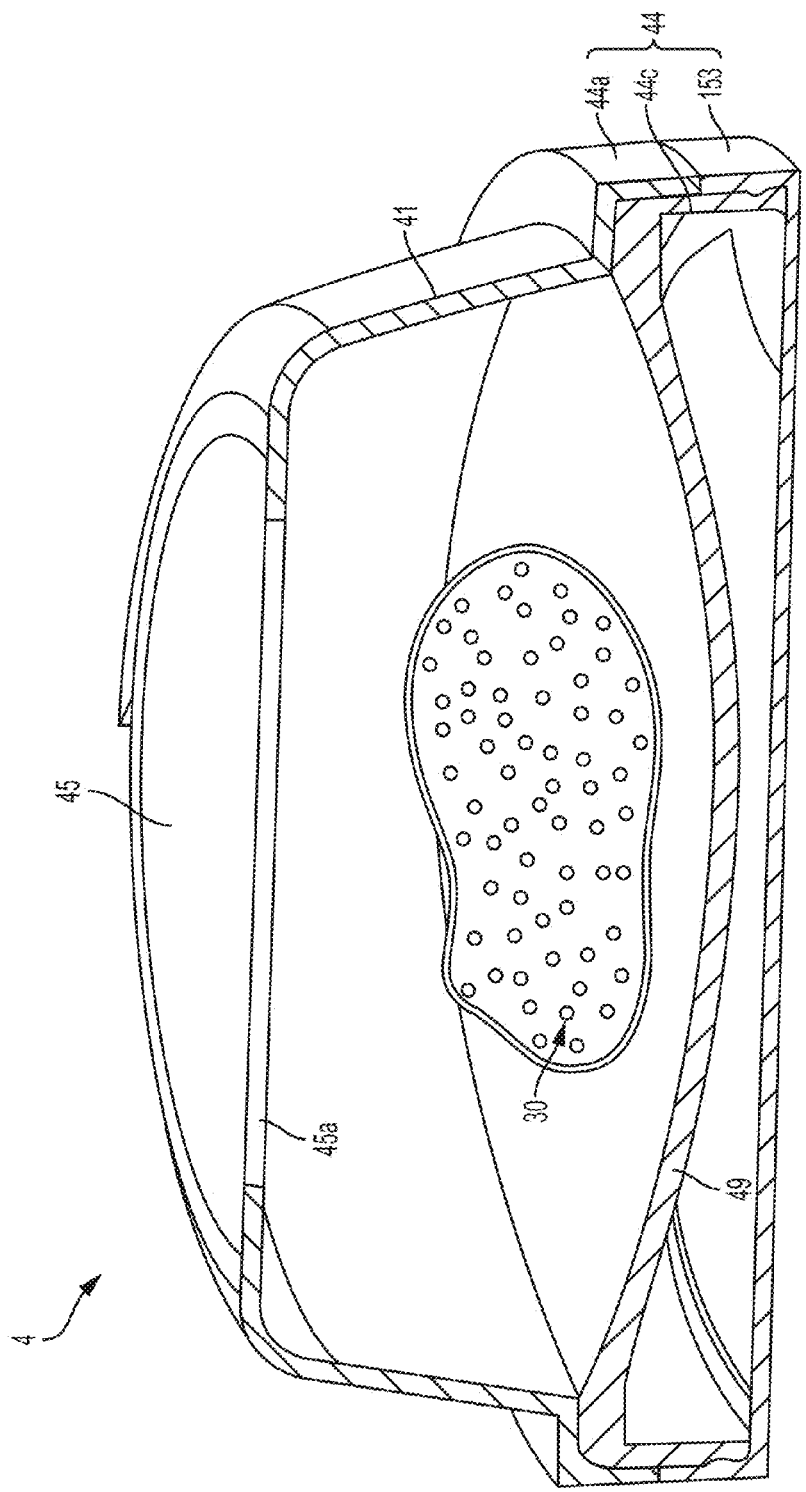
FIG. 20 shows a cross-sectional view of the cartridge of FIG. 19.

As another example, shown in FIGS. 19-20, cartridge 4 is modified to have only a single portion 41 containing a gas source 30. The upper portion 41 attaches to a cap 153. As with the upper portion 41 in the embodiment shown in FIGS. 1-8, the portion 41 in the embodiment shown in FIGS. 19-20 includes a top lid 45, a filter 45a and a bottom wall 49 having a peripheral portion 44c. As seen in FIG. 20, the circumferential portion 44a of the upper portion 41, the cap 153, and the peripheral portion 44c combine together to form a rim 44.

The cartridge 4 may be made of any suitable materials, and is not necessarily limited to the constructions shown herein. For example, the cartridge may be made of, or otherwise include, materials that provide a barrier to moisture and/or gases, such as oxygen, water vapor, etc. In one embodiment, the cartridge may be made of a polymer laminate, e.g., formed from a sheet including a layer of polystyrene, polypropylene and/or a layer of EVOH and/or other barrier material, such as a metallic foil. In one embodiment, the cartridge is injection molded. Moreover, the cartridge materials and/or construction may vary according to the materials contained in the cartridge. For example, a portion of the cartridge 4 containing a gas source material may require a robust moisture barrier, whereas a beverage medium portion may not require such a high moisture resistance. Thus, the cartridges may be made of different materials and/or in different ways. In addition, the cartridge interior may be differently constructed according to a desired function. For example, a beverage medium cartridge portion may include baffles or other structures that cause the liquid/beverage medium to follow a tortuous path so as to encourage mixing. The gas source cartridge portion may be arranged to hold the gas source in a particular location or other arrangement in the interior space, e.g., to help control wetting of the gas source with activating liquid. Thus, as used herein, a "cartridge" may take any suitable form, such as a pod (e.g., opposed layers of filter paper encapsulating a material), capsule, sachet, package, or any other arrangement. The cartridge may have a defined shape, or may have no defined shape (as is the case with some sachets or other packages made entirely of flexible material). The cartridge may be impervious to air and/or liquid, or may allow water and/or air to pass into the cartridge.

In accordance with one aspect of the invention, the cartridge includes an indicator that is readable by a beverage making system or other indicator reader. As seen in one illustrative embodiment, seen in FIG. 15, cartridge 4 includes an indicator 179 that is readable by a beverage making system. As non-limiting, illustrative examples, the indicator may be an RFID tag, barcode, alphanumeric string, taggant, taggant ink, or other suitable indicator.

The indicator may be used to provide any suitable information to the beverage making system or to another reader. For example, the indicator may inform the beverage making system of the type of contents contained within the cartridge such as a specific flavor, volume, gas-only or beverage medium-only, which may cause the beverage making system to perform operation that is suitable for such contents. In some embodiments, the indicator may provide product authentication, expiration information, and/or manufacturing information such as lot number and manufacturing facility.

In some embodiments, the indicator may indicate to the beverage making system the carbonation level to be used for the beverage. After determining the carbonation level from the cartridge 4, a control circuit/controller of the beverage making system may control the system accordingly. Thus, a user need not select the carbonation level by interacting with the system 1, but rather a carbonation level may be automatically adjusted based on the beverage selected. In yet another embodiment, a user may be able to select a gas source cartridge 4 that matches a carbonation level the user desires. (Different carbonation levels may be provided in the different cartridges by having different amounts of gas source in the cartridge 4.) For example, cartridges providing low, medium and high carbonation levels may be provided for selection by a user, and the user may pick the cartridge that matches the desired carbonation level, and provide the selected cartridge to the system 1. Thus, a gas source cartridge labeled "low" may be chosen and used with the system to create a low level carbonated beverage.

A user may alternately be permitted to define characteristics of a beverage to be made by interacting in some way with a cartridge 4 to be used by the system 1. For example, tab, notch or other physical feature of the cartridge may be altered or formed by the user to signify a desired beverage characteristic. For example, a broken tab, slider indicator, a covered or uncovered perforation on a portion of the cartridge, etc., that is created by the user may indicate a desired carbonation level, an amount of beverage medium to use in forming the beverage (where the system 1 is controllable to use less than all of the beverage medium in the cartridge to form a beverage), and so on. Features in the cartridge 4 may also be used by the control circuit/controller to detect features of the cartridge, a beverage being formed or other components of the system 1. For example, light guides in a cartridge 4 may provide a light path to allow a controller to optically detect a level of beverage medium in the cartridge 4, a flow of precursor liquid in the cartridge 4, pressure in the cartridge (e.g., where deflection of a cartridge portion can be detected and indicates a pressure), a position of a piston, valve or other cartridge component, an absence of beverage medium in the cartridge (to signify completion of beverage formation), and so on. Other sensor features may be incorporated into the cartridge, such as electrical sensor contacts (e.g., to provide conductivity measurements representative of a carbonation level or other properties of a precursor liquid), an acoustic sensor (to detect gas emission, fluid flow, or other characteristics of the cartridge), and so on.

A cartridge may also be arranged to provide a visual or other detectable indication regarding the cartridge's fitness for use in forming a beverage. For example, the cartridge may include a pop-up indicator, color indicator or other feature to show that the gas sources has been at least partially activated. Upon viewing this indication, a user may determine that the cartridge is not fit for use in a beverage making machine. In another embodiment, an RFID tag may be associated with a sensor that detects gas source activation (e.g., via pressure increase), beverage medium spoilage (e.g., via temperature increase), or other characteristic of the cartridge, which may be transmitted to a reader of a beverage making machine. The machine may display the condition to a user and/or prevent activation of the machine to use the cartridge to form a beverage.

The inventors have appreciated that, after evacuation of beverage medium from the cartridge, residual beverage medium may remain in the cartridge rather than being incorporated into the beverage, and is thus wasted. The inventors have recognized a need for efficient beverage medium evacuation from the cartridge.

The inventors have recognized that the shape and geometry of the internal space holding the beverage medium can influence the efficacy of dispensing beverage medium out of the internal space of the cartridge. In some cases, beverage medium that settles into trenches or grooves within the cartridge be difficult to dispense out of the cartridge. In addition, beverage medium that settles into portions of the internal space that are level with or below the height of the flow control element of the beverage medium outlet may be difficult to dispense out of the cartridge.

In one aspect of the invention, the entire beverage medium-containing internal space of the cartridge is above the height of the flow control element of the beverage medium outlet. In another aspect of the invention, any trenches or grooves within the beverage medium-containing internal space are filled in or otherwise obstructed to prevent beverage medium from settling into the trenches or grooves.

Figure 21A:
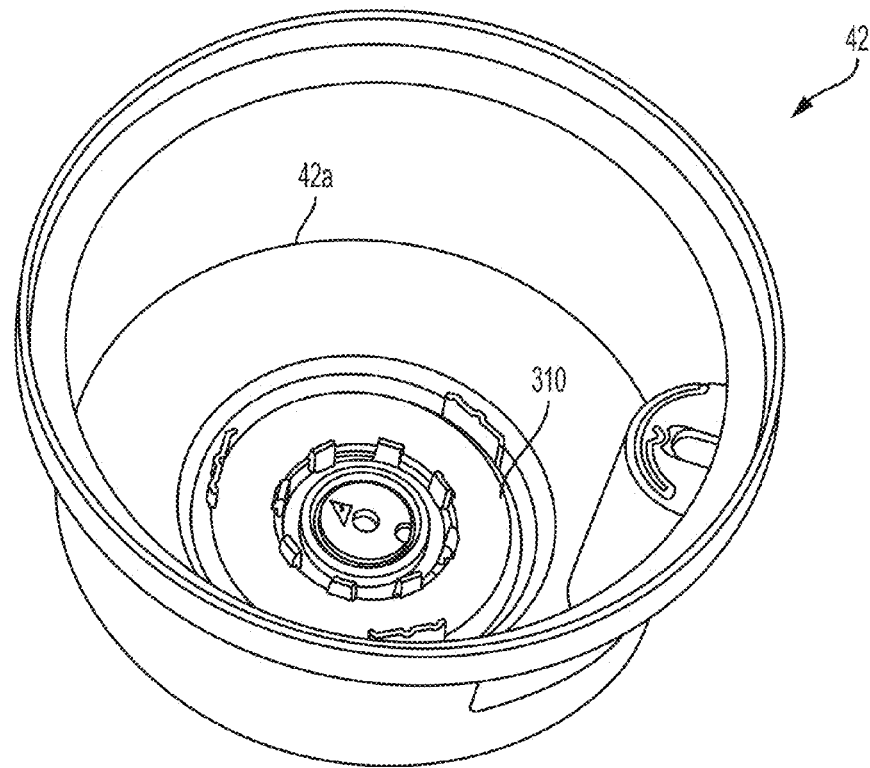
FIG. 21A shows a perspective view of the inside of the lower portion of the FIG. 1A cartridge.
Figure 21B:
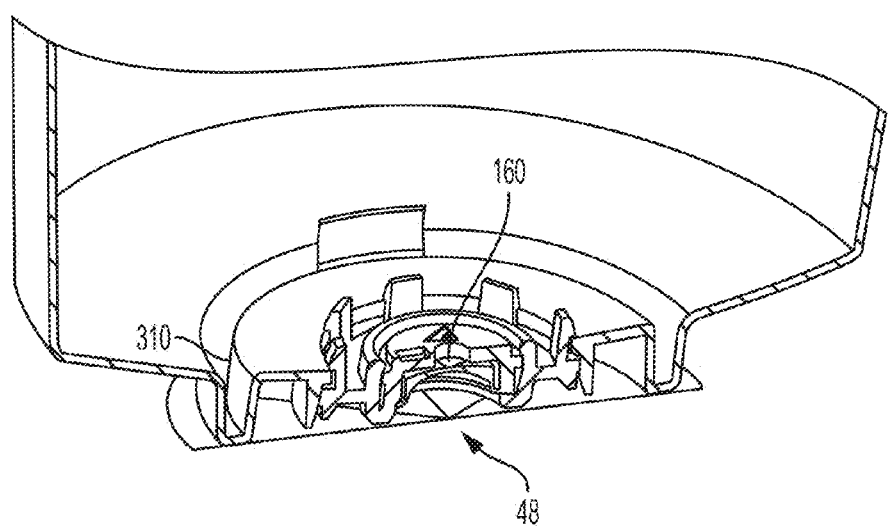
FIG. 21B shows an enlargement of part of the lower portion of the FIG. 1A cartridge.
Figure 22:
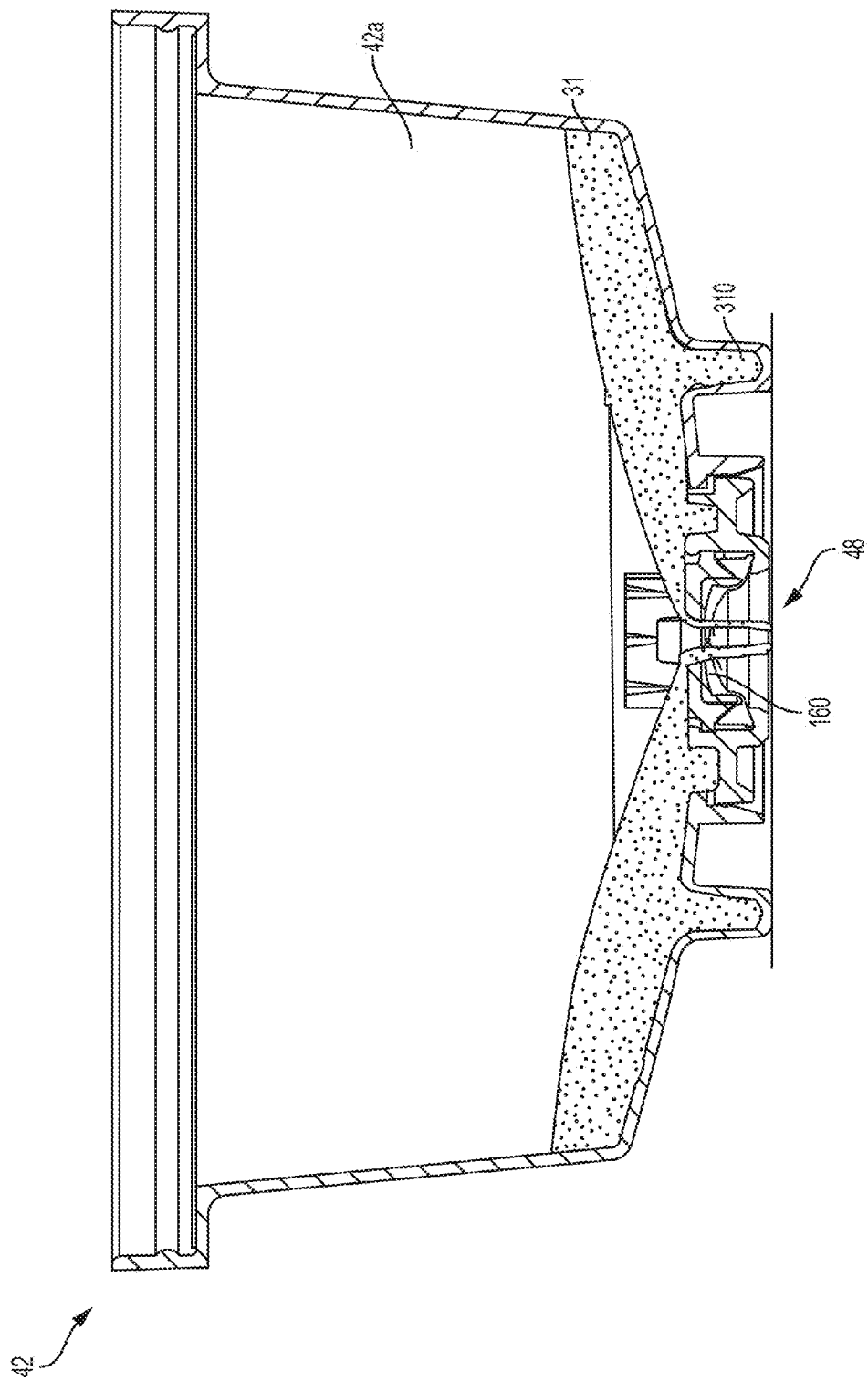
FIG. 22 shows a cross-sectional view of the lower portion of the cartridge shown in FIG. 21A.

In one illustrative embodiment, as seen in FIGS. 21A-21B, a cartridge lower portion 42 has an internal space 42a with a circular trench 310 formed at the bottom of the internal space. The trench protrudes downward to a level that is lower than the height of the outlet valve 160. As seen in FIG. 22, with beverage medium 31 held in the cartridge lower portion 42, a portion of the beverage medium 31 settles into the trench 310. Because this portion of beverage medium is located in a trench and is at a level that is lower than the height of the outlet valve 160, this portion of beverage medium is difficult to dispense out of the cartridge and will likely remain in the cartridge as residual beverage medium.

Figure 23:
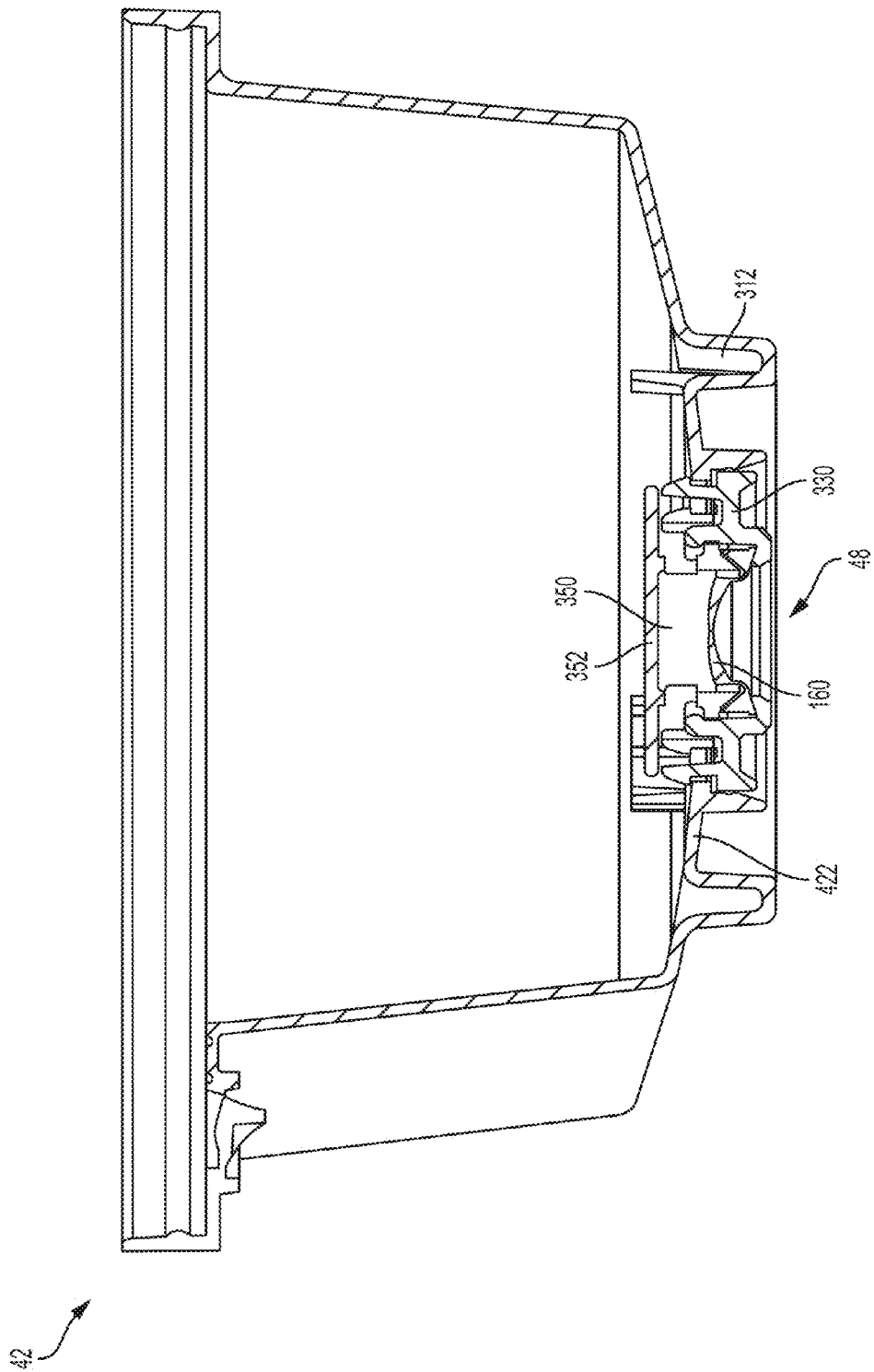
FIG. 23 shows a cross-sectional view of a modified version of the FIG. 21A cartridge.

According to one aspect, to prevent beverage medium from entering and being trapped in the trench 310, the cartridge may include a trench filler 312 located in the trench as shown in FIG. 23. The top surface of the trench filler 312 may serve as an extension of the bottom wall 422 of the cartridge. The bottom wall 422 and trench filler 312 may combine to form a sloped surface that slopes downward toward the outlet 48 to encourage beverage medium to move toward the outlet.

In this illustrative embodiment, the trench filler 312 is a component that is formed separately from the cartridge and then inserted into the trench 310. However, it should be appreciated that other arrangements are possible. For example, the trench filler 312 may be an initially-liquid or flowing substance that is poured or otherwise flowed into the trench 310 to fill in the trench. The initially-liquid or flowing substance may then cure or otherwise solidify. The trench filler 312 may be coupled to the cartridge via interference fit, snap fit, mechanical interlock, adhesive, welding, or other suitable coupling arrangement. In another example, the trench filler 312 and the cartridge may be molded as a single part.

In accordance with another aspect, a flow director such as a hood is used to redirect the flow of beverage medium exiting the cartridge to enable more efficient beverage medium evacuation. Without wishing to be bound by any theory, in some cases, the beverage medium flows out of the cartridge as a continuous stream. In some cases, once the continuity of the stream is broken, beverage medium that is upstream from the break point stops moving toward the outlet, and, as a result, remains in the cartridge as residual beverage medium. Air entrainment into the flow stream can serve to break the continuity of the beverage medium stream and cause residual beverage medium to form. In some cases, having a flow director such as a hood, plate, or other physical obstruction overlying an outlet alters the flow profile of beverage medium moving towards and exiting through the outlet in a way that decreases air entrainment. The flow director may include holes that function as a bottleneck to prevent discontinuity of the beverage medium stream exiting the cartridge. In some cases, once the beverage medium stream reaches the necked region of the flow director, the stream becomes backed up at the necked region, helping to preserve the continuity of the beverage medium stream.

In addition, without wishing to be bound by any theory, residual beverage medium may build up at locations in the cartridge furthest away from the outlet. For example, where the outlet is situated at the center of the cartridge, residual beverage medium may build up at the sides of the cartridge. In some embodiments, a flow director may be included and positioned directly over the outlet. In some cases, the flow director may direct air pressure out towards the areas of beverage medium build up to encourage beverage medium to move towards the outlet.

Figure 24:
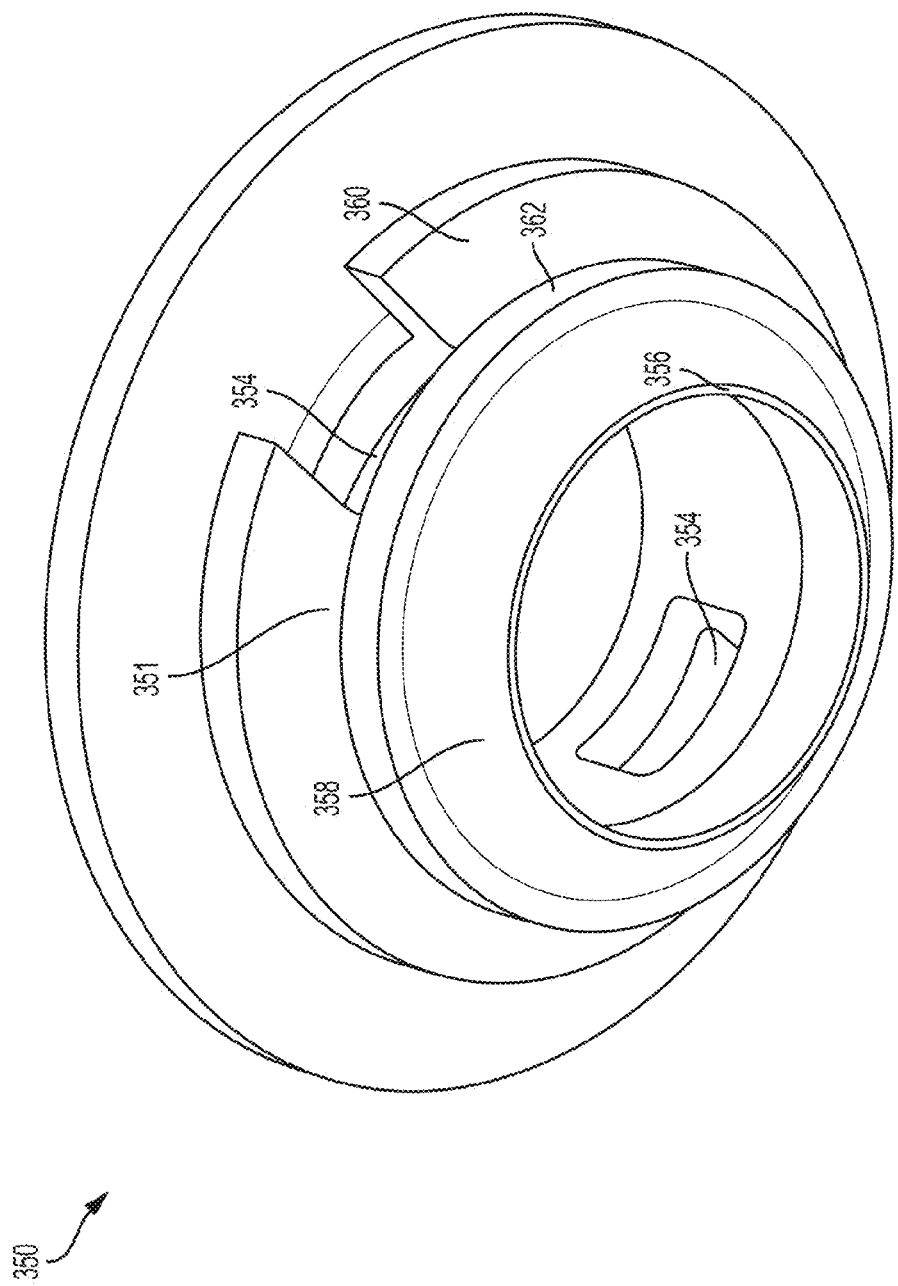
FIG. 24 shows a perspective view of a flow director hood used in the FIG. 23 cartridge.

In one illustrative embodiment, as seen in FIG. 23, the cartridge lower portion 42 includes a flow director 350 that is aligned with the outlet valve 160 of the outlet 48. As best seen in FIG. 24, the flow director 350 includes side holes 354 that receive and redirect beverage medium downward through the outlet hole 356. In the illustrative embodiment shown in FIG. 24, the flow director 350 has two side holes 354. However, it should be appreciated that more or less side holes may be included. The side holes 354 may be oriented in a direction different from a direction of the outlet hole 356. For example, the side holes 354 may be oriented perpendicular to the outlet hole 356. The flow director 350 has a top surface 352 that extends over the outlet hole 356. In embodiments where side holes 354 are used, the flow director may extend over the side holes 354 as well. In some embodiments, the flow director is circular. The flow director may be rotationally symmetric. In the embodiment shown in FIG. 24, the flow director is rotationally symmetric and has line symmetry as well.

Figure 25:
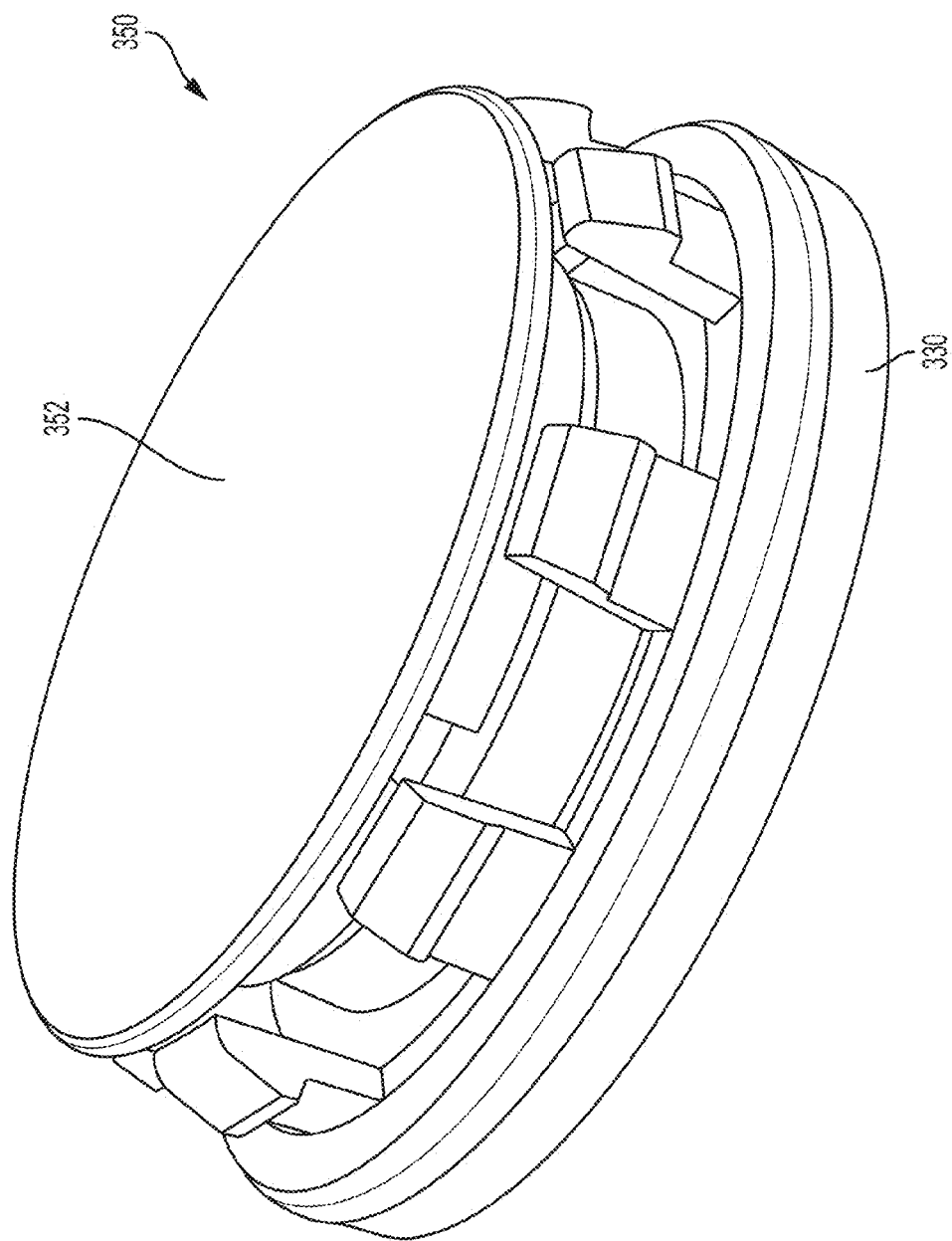
FIG. 25 shows a perspective view of the FIG. 24 flow director hood coupled to a carrier.
Figure 26:
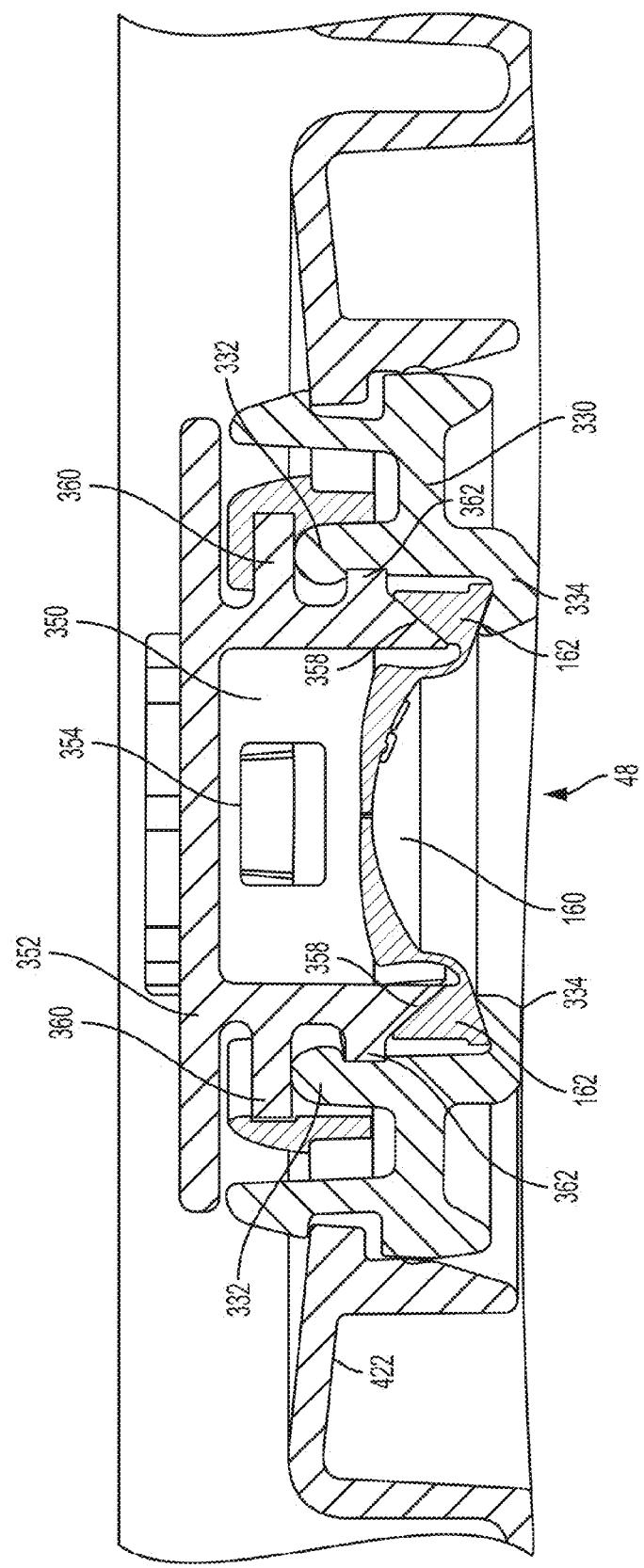
FIG. 26 shows an enlargement of a part of the FIG. 23 cartridge.

As seen in FIGS. 25-26, the top surface 352 closes off the top of the flow director 350, prohibiting beverage medium from entering the flow director 350 through the top. As a result, beverage medium can only exit the cartridge by entering the side of flow director 350 through the side holes 354. In some cases, as discussed above, the top surface 352 may serve to divert air pressure out toward the sides of the cartridge to encourage movement of beverage medium that has collected at the sides to move toward the outlet 48. In the illustrative embodiment of FIGS. 24-26, the top surface is circular. However, other shapes such as an ellipse, square, rectangle, irregular polygon may be used. The top surface 352 may be larger or smaller in size than that shown in FIGS. 25-26. In some embodiments, the top surface 352 has a diameter of about 10-30 mm, of about 4-60 mm, or any other suitable diameter. The top surface 352 overlies the side holes 354. In some embodiments, the top surface 352 extends radially outwardly beyond the side holes 354.

The flow director 350 may be coupled to the cartridge in a variety of arrangements. In one illustrative embodiment, shown in FIGS. 23-26, the flow director 350 is coupled to the bottom wall 422 of cartridge lower portion 42 via a carrier 330. As seen in FIG. 24, the flow director 350 includes a first ledge 360 and a second ledge 362 extending radially outward from the flow director sidewall 351. The first ledge 360 is at the same height as the side holes 354. The second ledge 362 is positioned below the first ledge 360. In some embodiments, the first ledge 360 extends further in a radially outward direction than the second ledge 362. In other embodiments, the ledges 360, 362 extend radially outward by the same distance, and in yet other embodiments, the second ledge 362 extends further in the radially outward direction than the first ledge 360. In the illustrative embodiment shown in FIG. 24, second ledge 362 extends in a complete circle around the circumference of the flow director 350. However, in other embodiments, the second ledge 362 may be a series of protrusions rather than a complete circle. In the illustrative embodiment shown in FIG. 24, first ledge 360 extends around the circumference of the flow director 350 but is interrupted by the side holes 354. In embodiments with more than one side hole, the first ledge 360 may extend around the circumference of the flow director 350 from one side hole 354 to the other, as shown in FIG. 24. However, in other embodiments, the first ledge 360 may be a series of shorter protrusions.

As best seen in FIG. 26, the bottom surface of the first ledge 360 abuts against and, in some cases, is supported by, the top of a protrusion 332 of the carrier 330. The second ledge 362 of the flow director 350 is located just below the protrusion 332 of the carrier 330. The protrusion 332 obstructs the second ledge 362 from upward movement relative to the carrier 330, and thus the flow director 350 is prohibited from upward movement relative to the carrier 330 due to physical interference between the protrusion 332 and the second ledge 362.

As an additional reinforcement or as an alternative, the flow director 350 may attach to the carrier 330 via adhesive, welding, physical interlock, interference fit, or other suitable attachment arrangement. In some embodiments, the flow director 350 is directly coupled to the walls of the cartridge, e.g., to bottom wall 422, without a carrier as an intermediary.

It should be appreciated that the flow director may be coupled to the cartridge using different arrangements. For example, instead of the bottom of the flow director being coupled to the cartridge, the top and/or the sides of the flow director may be coupled to the cartridge.

It should also be appreciated that the flow director may differ from the structure shown in the figures. For example, in one embodiment, the flow director may comprise a single plate (top surface 352) that is spaced above an outlet. The single plate may be suspended from above (e.g., the top of the single plate is coupled to the cartridge), may be supported from the sides, and/or from the bottom. The plate may overlie and extend radially outwardly beyond one or more outlet holes. The flow director may not include any side holes at all.

In some embodiments, the flow director 350 may interact with a flow control element of the outlet. In one illustrative embodiment, the flow director serves to secure a flow control element of the outlet in place. As best seen in FIGS. 24 and 26, an outlet sidewall 358 of the flow director 350 abuts against the top surface of an engagement portion 162 of the outlet valve 160. The bottom surface of the engagement portion 162 of the outlet valve 160 abuts against a carrier ledge 334 of the carrier 330. With the engagement portion 162 of the outlet valve 160 sandwiched between the flow director sidewall 351 and a carrier ledge 334, the outlet valve 160 is held in place. As an additional reinforcement or as an alternative, the outlet valve 160 may attach to the flow director 350 and/or the carrier 330 via adhesive, welding, physical interlock, interference fit, or other suitable attachment arrangement. In some embodiments, the outlet valve 160 is directly coupled to the walls of the cartridge, e.g., to bottom wall 422 without a carrier and/or a flow director.

According to one aspect of the invention, the gas source includes a charged adsorbent or molecular sieve, e.g., a zeolite material that has adsorbed some amount of carbon dioxide gas that is released in the presence of water, whether in vapor or liquid form. Of course, other carbon dioxide source materials may be used, such as charcoal or other molecular sieve materials, carbon nanotubes, metal organic frameworks, covalent organic frameworks, porous polymers, or source materials that generate carbon dioxide by chemical means, such as sodium bicarbonate and citric acid (with the addition of water if the bicarbonate and acid are initially in dry form), or others. In addition, aspects of the invention are not necessarily limited to use with carbon dioxide gas, but may be used with any suitable gas, such as nitrogen, which is dissolved in some beers or other beverages, oxygen, air, and others. Thus, reference to "carbonation", "carbon dioxide source" "carbon dioxide activating fluid supply", etc., should not be interpreted as limiting aspects of the invention and/or any embodiments to use with carbon dioxide only. Instead, aspects of the invention may be used with any suitable gas.

In one embodiment, the charged adsorbent is a zeolite such as analcime, chabazite, clinoptilolite, heulandite, natrolite, phillipsite, or stilbite. The zeolite may be naturally occurring or synthetic, and may be capable of holding up to about 20% carbon dioxide by weight or more. The zeolite material may be arranged in any suitable form, such as a solid block (e.g., in disc form), particles of spherical, cubic, irregular or other suitable shape, and others. An arrangement that allows the zeolite to flow or be flowable, e.g., spherical particles, may be useful for packaging the zeolite in individual cartridges. Such an arrangement may allow the zeolite to flow from a hopper into a cartridge portion, for example, simplifying the manufacturing process. The surface area of the zeolite particles may also be arranged to help control the rate at which the zeolite releases carbon dioxide gas, since higher surface area measures typically increase the gas production rate. Generally, zeolite materials will release adsorbed carbon dioxide in the presence of water in liquid or vapor form, allowing the zeolite to be activated to release carbon dioxide gas by the addition of liquid water to the zeolite.

In one aspect of the invention, the cartridge or cartridges used to form a beverage using the beverage making system may have a volume that is less, and in some cases substantially less, than a beverage to be made using the cartridge(s). For example, a cartridge may have upper and lower portions 41, 42 that each have a volume that is about 50-60 ml or less, and yet can be used to form a beverage having a volume of about 200-500 ml or more. The inventors have found (as shown in some of the Examples below) that an amount of charged carbon dioxide adsorbent (e.g., a charged zeolite) of about 20-30 grams (which has a volume of less than 30 ml) can be used to produce about 240-500 ml of carbonated water having a carbonation level of up to about 3.5 volumes. Moreover, it is well known that beverage-making syrups or powders having a volume of less than about 50 ml, or less than about 100 ml, can be used to make a suitably flavored beverage having a volume of about 400-500 ml. Thus, relatively small volume cartridges (or a single cartridge in some arrangements) having a volume of about 100 ml to about 250 ml or less may be used to form a carbonated beverage having a volume of about 100 to 1000 ml, and a carbonation level of at least about 1.5 to 4 volumes in less than 120 seconds, e.g., about 60 seconds, and using pressures of 20-50 psi or more.

Example 1

The release properties of a carbon dioxide adsorbent were measured in the following way: 8×12 beads of sodium zeolite 13X (such as are commercially available from UOP MOLSIV Adsorbents) were obtained. The beads were placed in a ceramic dish and fired in a Vulcan D550 furnace manufactured by Ceramco. The temperature in the furnace containing the beads was raised to 550° C. at a rate of 3° C./min and was held at 550° C. for 5 hours for firing and preparation of the beads for charging with carbon dioxide.

The beads were removed from the furnace and immediately transferred to a metal container equipped with a tightly fitted lid and entrance and exit ports permitting circulation of gas. With the beads sealed in the container, the container was flooded with carbon dioxide gas and pressurized to 15 psig. (Note, however, that experiments have been performed between 0-32 psig.) At the end of a hold period, a quantity of gas had adsorbed to the beads.

A 30 g sample of charged 13X zeolite was measured, and a beaker filled with 250 ml of water at room temperature of 22° C. The beaker and water was placed on a balance and the balance zeroed. The 30 g of charged zeolite was then added to the beaker and the change in weight versus time was measured. It was shown that the change in weight became approximately steady after a period of 50 seconds, and that the beads lost about 4.2 g (14 wt %) of weight attributed to the release of carbon dioxide. Of course, some carbon dioxide may have been dissolved into the water.

| Time (sec) | Weight (grams) |
| --- | --- |
| 0 | 30 |
| 25 | 26.7 |
| 50 | 25.8 |
| 75 | 25.6 |
| 100 | 25.5 |

Example 2

Charged zeolite 13X was prepared as in Example 1. A 30 g sample of the charged zeolites was then placed in metal chamber with a water inlet port at the bottom and a gas outlet port at the top. The chamber that held the zeolites was 34×34 mm in cross-section and had 2 metal filter discs with 64 1/16" diameter holes to retain the zeolite material. Tap water was then flooded into the bottom of the chamber perpendicular to the cross-section at an average flow rate of 60 ml/min. Gas evolved through the top outlet port.

The pressure of the gas in the chamber was measured with a pressure gauge and controlled using a needle valve attached to the exit port of the gas chamber. The needle valve was set to maintain the chamber at a pressure of 35 psig by manually adjusting the valve over the course of exposing charged zeolites in the chamber to water. Once the valve was set to an operating pressure, the system would perform repeatably with zeolite samples charged in the same manner.

Example 3

Charged zeolite 13X was prepared as in Example 1. A 30 g sample of the charged zeolites was then placed in a semi rigid 50 ml polystyrene-polyethylene-EVOH laminate cup container and thermally sealed with a foil lid. The sealed zeolite cartridges were then placed into a sealed, metal cartridge chamber and pierced on the top and bottom.

Tap water was introduced at the bottom of the cartridge with the flow controlled by a solenoid valve. The solenoid valve was actuated via a pressure switch connected to the top gas outlet of the cartridge chamber. During three different tests, the pressure switch was set to three different operating pressures of 5, 22, and 35 psig. The resulting gas at the set pressures was then introduced into the shellside of a hydrophobic membrane contactor (1×5.5 Minimodule from Liquicel, of Charlotte, N.C.). The other shellside port was plugged to prevent gas from escaping. Water from a reservoir containing 400 ml of water and approximately 50 g of ice was circulated from the reservoir, through the contactor, and back to the reservoir using an Ulka (Milan, Italy) type EAX 5 vibratory pump through the lumenside of the membrane contactor. The pressure of the reservoir and contactor was maintained at the same pressure as the gas was produced. The system produced gas and circulated the water for approximately 60 seconds before being stopped.

The resulting carbonated water was then tested for carbonation levels using a CarboQC from Anton-Paar of Ashland, Va. The results for are shown in the table below:

| System Pressure (psig) | Average Carbonation Level (Volumes $CO_2$ dissolved) |
|---|---|
| 10 | 1.35 |
| 22 | 2.53 |
| 35 | 3.46 |

Thus, the gas was shown to evolve from the zeolites in the cartridges at a controllable rate (based on water delivery to the cartridge chamber) and then dissolved into water to produce a carbonated beverage. In addition, this illustrates the concept that by controlling system pressures one can control the level of carbonation of the finished beverage. It is expected that higher system pressures, e.g., of about 40-50 psi above ambient, would produce a 4 volume carbonated beverage (having a liquid volume of about 500 ml) in about 60 seconds or less.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A beverage cartridge comprising:
a top surface;
a bottom surface;
a lower sidewall extending upwardly from the bottom surface;
the top surface, bottom surface and lower sidewall defining, in part, an internal space of the cartridge;
a rim between the top and bottom surfaces and having an upper surface and a lower surface extending outwardly from the lower sidewall, the internal space of the cartridge including a region between the upper and lower surfaces of the rim, and the rim being configured for engagement with a cartridge holder of a beverage making machine such that the cartridge holder can engage the rim and force the cartridge into a brewing position in the cartridge holder;
a gas inlet located on the lower surface of the rim, the gas inlet comprising a flow control element configured to resist fluid communication into the internal space of the cartridge and configured to open while a clamping force is exerted on the rim by the beverage making machine to admit pressurized gas into the internal space of the cartridge to move a beverage medium in the internal space of the cartridge out of the cartridge, wherein the flow control element includes a protrusion extending downwardly from the lower surface of the rim and a break region having a line of weakness defining a preferential opening area, wherein upward movement of the protrusion relative to the rim causes the break region to detach and open the gas inlet;
an indexing feature including a recess formed in the lower sidewall and located below the gas inlet to rotationally position the gas inlet of the cartridge relative to the cartridge holder;
wherein a gas introduced via the gas inlet enters into the region of the internal space of the cartridge between the upper and lower surfaces of the rim.

2. The beverage cartridge of claim 1, wherein:
the internal space of the cartridge includes an upper internal space and a lower internal space, and
the beverage cartridge further comprises:
an upper portion including the upper internal space containing a gas source, the upper portion including the top surface and an upper sidewall extending downwardly from the top surface to the rim; and
a lower portion including the lower internal space containing the beverage medium, the lower portion including the bottom surface and the lower sidewall extending upwardly from the bottom surface, wherein the rim extends radially outwardly from the upper and lower sidewalls,
wherein the flow control element is arranged to be opened to admit pressurized gas into the lower internal space to urge the beverage medium to exit the lower internal space.

3. The beverage cartridge of claim 2, wherein the rim provides first and second clamping surfaces for engagement by the cartridge holder of the beverage making machine to define a pressure tight seal to contain pressurized gas emitted by the gas source.

4. The beverage cartridge of claim 1, further comprising a lid inside the internal space of the cartridge and covering the gas inlet, the lid being configured to control flow of gas through the gas inlet into the internal space of the cartridge.

5. The beverage cartridge of claim 2, wherein the upper portion includes a bottom wall that bounds a bottom of the upper internal space of the upper portion, and separates the upper internal space from the lower internal space.

6. The beverage cartridge of claim 2, wherein the gas source comprises a zeolite gas source arranged to release gas in the presence of a liquid.

7. The beverage cartridge of claim 4, further comprising a lid, wherein the lower sidewall defines an opening that is closed by the lid.

8. The beverage cartridge of claim 2, wherein the upper portion has a substantially frustoconical shape.

9. The beverage cartridge of claim 2, wherein the lower sidewall flares upwardly and outwardly from the bottom surface.

10. The beverage cartridge of claim 2, wherein the lower portion includes an outlet located at the bottom surface through which the beverage medium exits the lower internal space.

11. The beverage cartridge of claim 4, wherein opening of the flow control element causes the lid to move upwardly relative to the lower surface of the rim.

12. The beverage cartridge of claim 11, wherein the gas inlet includes a break region having a line of weakness defining a preferential opening area of the rim.

13. The beverage cartridge of claim 1, wherein the rim is annular and has a thickness.

14. The beverage cartridge of claim 1, wherein the recess extends from the bottom surface to the lower surface of the rim.

15. The cartridge of claim 1, wherein the flow control element further includes a hinge, wherein upward movement of the protrusion relative to the rim causes the protrusion to pivot about the hinge and cause the break region to detach and open the gas inlet.

16. The cartridge of claim 15, wherein the protrusion has a slope at a lower surface such that the protrusion is longer on a side opposite the hinge so as to concentrate a breaking force on the break region when the protrusion is moved upwardly relative to the rim.

17. The cartridge of claim 1, wherein the gas inlet includes a D-shaped sealing region arranged around the flow control element, the D-shaped sealing region arranged to engage with a portion of the cartridge holder to form a gas-tight seal with the portion of the cartridge holder when admitting pressurized gas into the internal space.

18. The cartridge of claim 1, further comprising a gas path arranged to direct gas entering the cartridge at the gas inlet to the internal space, the gas path including a restriction to resist movement of beverage medium in the cartridge to the gas inlet.

19. A beverage cartridge comprising:
   a top surface;
   a bottom surface;
   a lower sidewall extending upwardly from the bottom surface, the top surface, bottom surface, and lower sidewall defining an internal space of the cartridge;
   a clamping structure between the top and bottom surfaces and having a lower surface extending outwardly from the lower sidewall, the clamping structure arranged for engagement with a cartridge holder of a beverage making machine such that the cartridge holder can engage the clamping structure and force the cartridge into a brewing position in the cartridge holder;
   a gas inlet located on the lower surface of the clamping structure, the gas inlet comprising a flow control element configured to resist fluid communication into the internal space of the cartridge and configured to open while a clamping force is exerted on the clamping structure by the beverage making machine to admit pressurized gas into the internal space of the cartridge out of the cartridge, wherein the flow control element includes a protrusion extending downwardly from the lower surface of the clamping structure;
   a lid inside the internal space of the cartridge covering the gas inlet, the lid being configured to control flow of gas through the gas inlet into the internal space of the cartridge,
   wherein upward movement of the protrusion relative to the clamping structure causes the lid to lift relative to the gas inlet to open fluid communication through the gas inlet into the internal space of the cartridge;
   and
   an indexing feature including a recess formed in the lower sidewall and located below the gas inlet to rotationally position the gas inlet of the cartridge relative to the cartridge holder.

20. The cartridge of claim 19, wherein the clamping structure includes one or more protrusions extending outwardly from the lower sidewall.

21. A beverage cartridge for forming a carbonated beverage, comprising:
   an upper portion including a top surface and an upper sidewall extending downwardly from the top surface, the top surface and upper sidewall defining an upper internal space;
   a lower portion including a bottom surface and a lower sidewall extending upwardly from the bottom surface, the bottom surface and lower sidewall defining a lower internal space, the upper and lower internal spaces being part of an internal space of the cartridge;
   a rim spaced from and positioned between the top and bottom surfaces, the rim having an upper surface extending radially outwardly beyond the upper sidewall and a lower surface extending radially outwardly beyond the lower sidewall and a lower surface extending radially outwardly beyond the lower sidewall, the upper and lower surfaces providing first and second clamping surfaces for engagement by a cartridge holder of a beverage making machine to define a pressure tight seal to contain pressurized gas emitted by the gas source, and the internal space including a region between the upper and lower surfaces of the rim;
   a gas inlet located on the lower surface of the rim, the gas inlet comprising a flow control element configured to resist fluid communication into the lower internal space, wherein the flow control element includes a protrusion extending downwardly from the lower surface of the rim and a break region having a line of weakness defining a preferential opening area, wherein upward movement of the protrusion relative to the rim causes the break region to detach and open the gas inlet;
   wherein at least a portion of the upper internal space overlies at least a portion of the lower internal space;
   and wherein a clamping force is exerted on the rim by the beverage making machine, the flow control element is upwardly moveable relative to the lower surface of the rim into the region of the internal space between the upper and lower surfaces to admit pressurized gas into the lower internal space to urge a beverage medium out of the lower internal space.

22. The beverage cartridge of claim 21, wherein the upper portion includes an upper rim portion, the lower portion includes a lower rim portion, and the upper and lower rim portions are joined together to form the rim.

23. The beverage cartridge of claim 22, further comprising a coupling member attached to the upper and lower rim portions.

24. The beverage cartridge of claim 23, wherein the upper and lower rim portions each include a circumferential portion at a radially outer end of the upper and lower surfaces of the rim, respectively.

25. The beverage cartridge of claim 21, further comprising a lid inside the internal space and covering the gas inlet, the lid being configured to control flow of gas into the internal space of the cartridge.

26. The beverage cartridge of claim 21, wherein the first and second clamping surfaces are annular.

27. The beverage cartridge of claim 21, wherein the lower portion includes an outlet located at the bottom surface of the lower portion through which the beverage medium exits the lower internal space.

28. The beverage cartridge of claim 21, wherein the lower portion has an indexing feature that includes a recess in the lower sidewall.

29. The beverage cartridge of claim 19, further comprising an opening that is closed by the lid.

* * * * *